(12) United States Patent
Jang

(10) Patent No.: US 12,183,327 B2
(45) Date of Patent: Dec. 31, 2024

(54) VOICE RECOGNITION SERVICE OPERATING METHOD AND ELECTRONIC DEVICE SUPPORTING SAME

(71) Applicant: Samsung Electronics Co., Ltd., Suwon-si (KR)

(72) Inventor: Sungwoon Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 664 days.

(21) Appl. No.: 17/054,753

(22) PCT Filed: Jun. 7, 2019

(86) PCT No.: PCT/KR2019/006872
§ 371 (c)(1),
(2) Date: Nov. 11, 2020

(87) PCT Pub. No.: WO2019/235878
PCT Pub. Date: Dec. 12, 2019

(65) Prior Publication Data
US 2021/0217406 A1    Jul. 15, 2021

(30) Foreign Application Priority Data
Jun. 8, 2018 (KR) ............ 10-2018-0066045

(51) Int. Cl.
*G10L 15/06* (2013.01)
*G06N 20/00* (2019.01)
(Continued)

(52) U.S. Cl.
CPC ............ *G10L 15/063* (2013.01); *G06N 20/00* (2019.01); *G10L 15/18* (2013.01); *G10L 15/22* (2013.01);
(Continued)

(58) Field of Classification Search
CPC ....... G10L 15/063; G10L 15/18; G10L 15/22; G10L 2015/223; G10L 2015/225; G10L 15/16; G06N 20/00
See application file for complete search history.

(56) References Cited

U.S. PATENT DOCUMENTS 6,397,186 B1 *  5/2002  Bush ................... G06F 3/167
                                                            704/E15.044
8,903,727 B2   12/2014  Comerford et al.
(Continued)

FOREIGN PATENT DOCUMENTS

KR   10-2010-0011786 A    2/2010
KR   10-2011-0066357 A    6/2011
(Continued)

OTHER PUBLICATIONS

International Search Report and Written Opinion of the International Searching Authority in connection with International Application No. PCT/KR2019/006872 dated Sep. 19, 2019, 9 pages.
(Continued)

*Primary Examiner* — Michael Colucci

(57) ABSTRACT

An artificial intelligence system training method comprises the operations of: receiving an input; determining an operation sequence according to the input; determining whether or not there is a learned training database with respect to the determined operation sequence; when there is no learned training database with respect to the determined operation sequence, executing an operation according to the determined operation sequence; providing execution completion feedback with respect to the execution of the operation; determining whether or not the determined operation sequence is an input related to user training; when the determined operation sequence is determined to be the input related to the user training, tracking a user input and electronic device execution information; and updating
(Continued)

domain and state information according to the tracked user input and electronic device execution information.

11 Claims, 15 Drawing Sheets

(51) Int. Cl.
*G10L 15/18* (2013.01)
*G10L 15/22* (2006.01)
(52) U.S. Cl.
CPC .. *G10L 2015/223* (2013.01); *G10L 2015/225* (2013.01)

(56) References Cited

U.S. PATENT DOCUMENTS

| | | | | |
|---|---|---|---|---|
| 10,600,406 | B1* | 3/2020 | Shapiro | G10L 15/22 |
| 2005/0275558 | A1* | 12/2005 | Papadimitriou | G10L 15/22 |
| | | | | 704/E15.04 |
| 2007/0198271 | A1* | 8/2007 | Abramson | G10L 15/26 |
| | | | | 704/275 |
| 2011/0060587 | A1* | 3/2011 | Phillips | G10L 15/30 |
| | | | | 704/235 |
| 2011/0144999 | A1 | 6/2011 | Jang et al. | |
| 2014/0278413 | A1 | 9/2014 | Pitschel et al. | |
| 2014/0278424 | A1* | 9/2014 | Deng | G06N 3/084 |
| | | | | 704/257 |
| 2014/0365226 | A1* | 12/2014 | Sinha | G10L 15/22 |
| | | | | 704/275 |
| 2015/0186110 | A1* | 7/2015 | Kannan | G06F 3/167 |
| | | | | 715/728 |
| 2016/0225370 | A1 | 8/2016 | Kannan et al. | |
| 2017/0212886 | A1* | 7/2017 | Sarikaya | G10L 15/22 |
| 2017/0270909 | A1 | 9/2017 | Yokoya et al. | |
| 2017/0372199 | A1* | 12/2017 | Hakkani-Tur | G06N 3/044 |
| 2018/0137854 | A1 | 5/2018 | Perez | |
| 2018/0143802 | A1* | 5/2018 | Jang | G10L 15/30 |

FOREIGN PATENT DOCUMENTS

| | | |
|---|---|---|
| KR | 10-1197010 B1 | 11/2012 |
| KR | 10-2015-0113127 A | 10/2015 |
| KR | 10-2017-0115501 A | 10/2017 |

OTHER PUBLICATIONS

Communication pursuant to Article 94(3) EPC dated Feb. 16, 2023, in connection with European Application No. 19814725.8, 6 pages.
Summons to attend oral proceedings pursuant to Rule 115(1) EPC dated Jan. 25, 2024, in connection with European Patent Application No. 19814725.8, 6 pages.
Office Action dated May 27, 2024, in connection with Korean Patent Application No. 10-2018-0066045, 11 pages.

\* cited by examiner

VOICE RECOGNITION SERVICE OPERATING METHOD AND ELECTRONIC DEVICE SUPPORTING SAME

CROSS-REFERENCE TO RELATED APPLICATIONS

This application is a 371 National Stage of International Application No. PCT/KR2019/006872, filed Jun. 7, 2019, which claims priority to Korean Patent Application No. 10-2018-0066045, filed Jun. 8, 2018, the disclosures of which are herein incorporated by reference in their entirety.

BACKGROUND

1. Field

The disclosure relates to a method of operating a voice recognition service and an electronic device supporting the same.

2. Description of Related Art

An artificial intelligence system may perform a task requested by a user and provide information or a service according to the requested task. Capabilities of an artificial intelligence secretary are understanding of a user's utterance and depend on the accuracy of performance of a task according to an intent of the utterance. The artificial intelligence secretary may infer a user's intent by analyzing a user's input and perform tasks according to the inferred intent, and is required to perform a task according to a user's intent expressed through a natural language interaction between the user and the artificial intelligence secretary.

SUMMARY

When an artificial intelligence system does not understand an inferred intent of a user's utterance, the artificial intelligence system is required to ask the user about whether a command intent is proper. In order to detect the user intent, the artificial intelligence system needs to confirm the user intent or check user input again. In this case, due to repetitive generation of the user's re-utterance, the usage of the artificial intelligence system may deteriorate.

Various embodiments of the disclosure provide a method by which the user trains the artificial intelligence system when the artificial intelligence system performs an action that does not match the user intent or cannot detect the user intent.

In accordance with an aspect of the disclosure, a method of training an artificial intelligence system is provided. The method includes: receiving an input; determining an action sequence according to the input; determining whether there is a learned training database related to the determined action sequence; when there is no learned training database related to the determined action sequence, performing an action using the determined action sequence; transmitting a feedback of completion of the action; determining whether the determined action sequence is an input for user training; when it is determined that the action sequence is the input for the user training, tracking a user input and execution information of an electronic device; and updating a domain and state information according to the tracked user input and execution information of the electronic device.

In accordance with another aspect of the disclosure, an electronic device is provided. The electronic device includes: a communication module; a processor; and a memory, wherein the memory stores instructions causing the processor to perform control to receive an input, determine an action sequence according to the input, determine whether there is a learned training database related to the determined action sequence, perform an action using the determined action sequence when there is no learned training database related to the determined action sequence, transmit a feedback of completion of the action, determine whether the determined action sequence is an input for user training, track a user input and execution information of the electronic device when it is determined that the action sequence is the input for the user training, and update a domain and state information according to the tracked user input and execution of the electronic device.

A method of training an artificial intelligence system according to various embodiments of the disclosure and an electronic device including the method may provide a specialized function to the user by allowing the user to train the artificial intelligence system in accordance with a user intent.

DETAILED DESCRIPTION

Figure 1A:
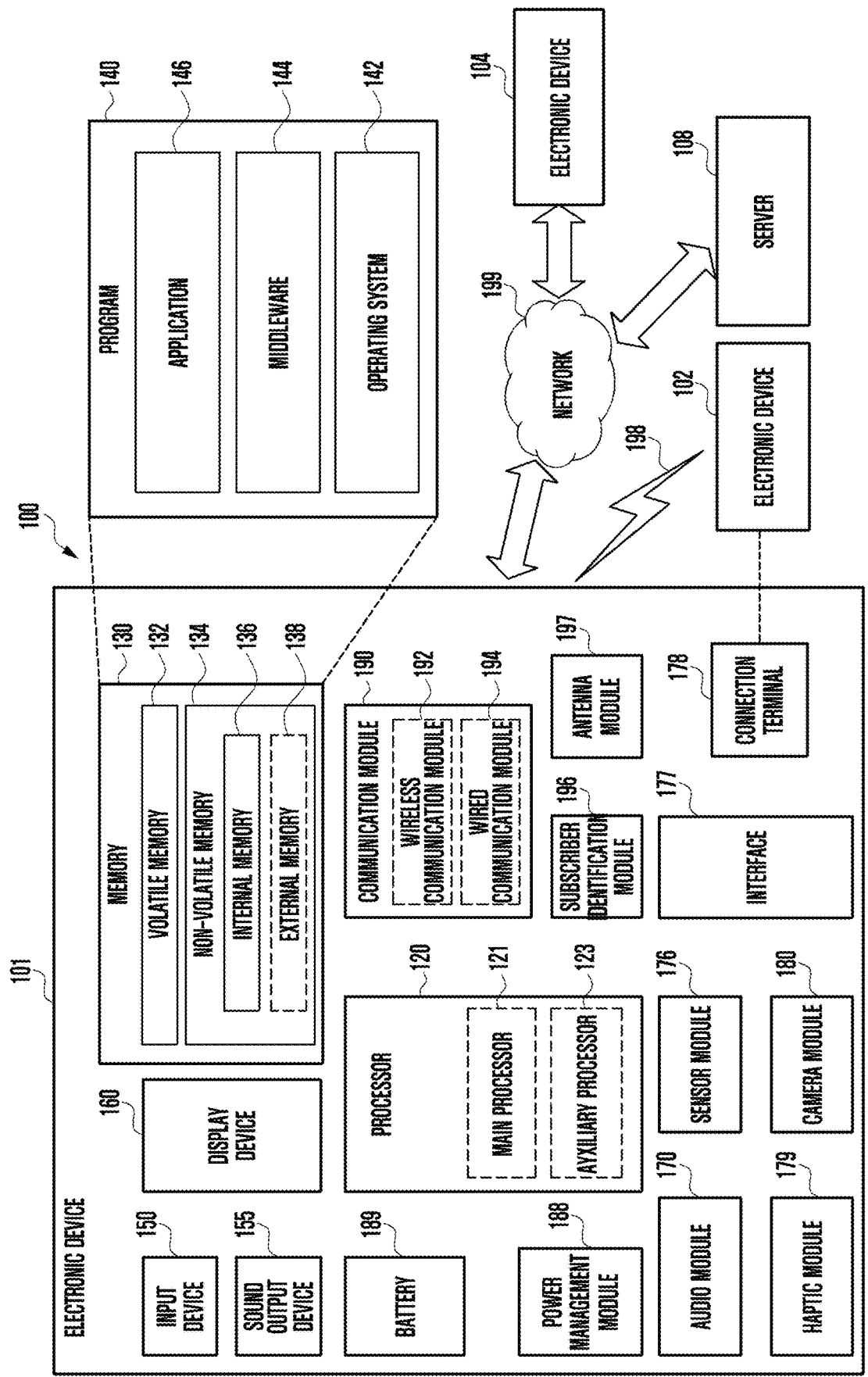
FIG. 1A is a block diagram illustrating an electronic device within a network environment according to various embodiments.

FIG. 1a is a block diagram illustrating an electronic device 101 in a network environment 100 according to various embodiments. Referring to FIG. 1a, the electronic device 101 in the network environment 100 may communicate with an electronic device 102 via a first network 198

(e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Prior to describing the present invention, an integrated intelligence system to which various embodiments of the present invention can be applied may be described with reference to FIGS. 1B, 1C, 1D, 1E, 1F, and 1G.

Figure 1B:
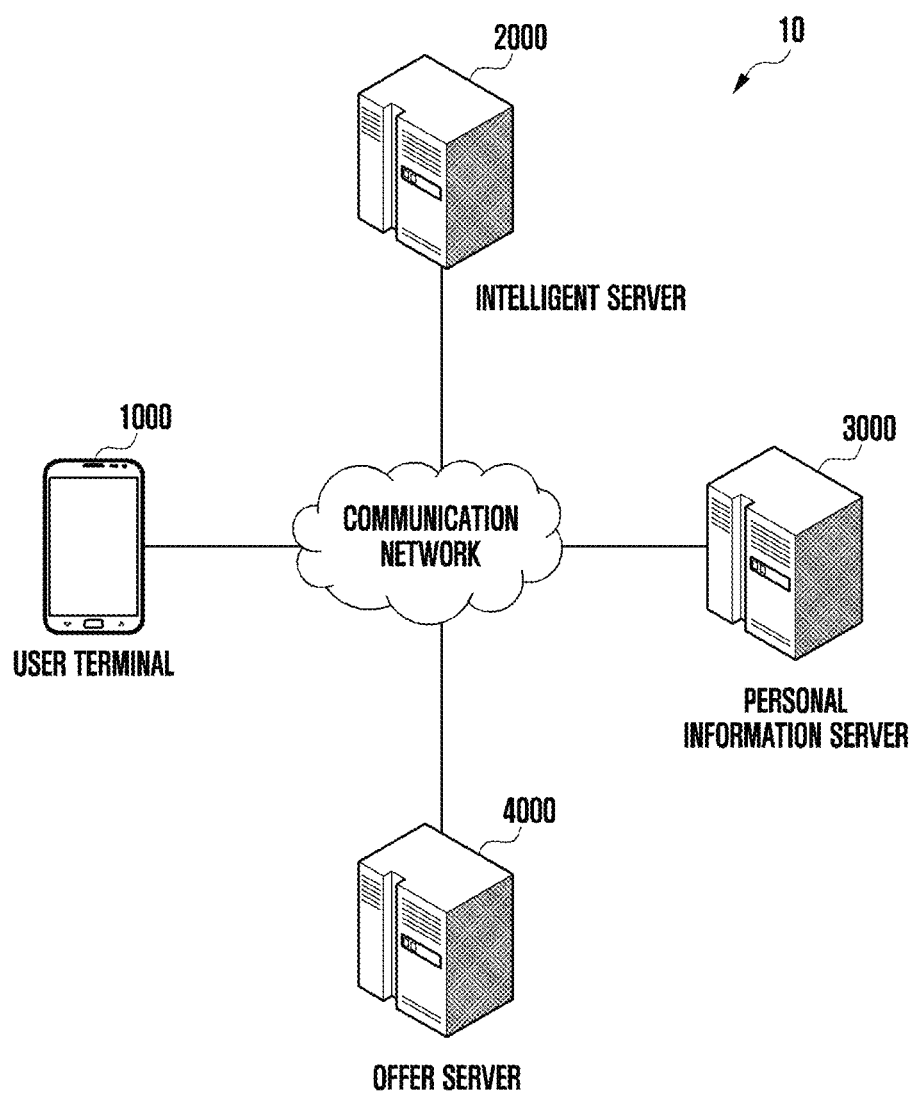
FIG. 1B illustrates an integrated intelligence system according to an embodiment.

FIG. 1B illustrates an integrated intelligence system according to an embodiment.

Referring to FIG. 1B, an integrated intelligence system 10 may include an electronic device 1000, an intelligent server 2000, a personal information server 3000, or an offer server 4000.

The electronic device 1000 may provide required services to the user through an app (or an application program) (for example, an alarm app, a message app, or a photo (gallery) app) stored within the electronic device 1000. For example, the electronic device 1000 may execute and operate another app through an intelligent app (or a voice recognition app) stored in the electronic device 1000. Through the intelligent app of the electronic device 1000, another app may be executed and a user input for executing an operation may be received. The user input may be received through, for example, a physical button, a touch pad, a voice input, or a remote input. According to an embodiment, the electronic device 1000 may correspond to various types of terminal devices (or electronic devices) capable of connecting to the Internet, such as a mobile phone, a smart phone, a personal digital assistant (PDA), or a notebook computer.

According to an embodiment, the electronic device 1000 may receive a user's utterance as a user input. The electronic device 1000 may receive a user's utterance and generate a command for executing an app on the basis of the user's utterance. Accordingly, the electronic device 1000 may execute the app using the command.

The intelligent server 2000 may receive a user's voice input from the electronic device 1000 through a communication network and convert the voice input into text data. In another example, the intelligent server 2000 may generate (or select) a path rule on the basis of the text data. The path rule may include information on an action (or an operation) for performing a function of the app or information on a parameter required for performing the action. Further, the path rule may include the sequence of action of the app.

The electronic device 1000 may receive the path rule, select an app according to the path rule, and perform the action included in the path rule in the selected app. The term "path rule" in this document may generally mean the sequence of states in which the electronic device (or electronic device) performs tasks requested by the user, but is not limited thereto. In other words, the path rule may include information on the sequence of the states. The task may be, for example, an action which the intelligent app can provide. The task may include generation of a schedule, transmission of photos to a desired counterpart, or provision of weather information. The electronic device 1000 may sequentially have one or more states (for example, action states of the electronic device 1000) so as to perform the task.

According to an embodiment, the path rule may be provided or generated by an artificial intelligence (AI) system. The artificial intelligence system may be a rule-based system or a neural network-based system (for example, a feedforward neural network (FNN) or a recurrent neural network (RNN)). Alternatively, the artificial intelligence system may be a combination thereof or another artificial intelligence system. According to an embodiment, the path rule may be selected from a set of predefined path rules, or may be generated in real time in response to a user request. For example, the artificial intelligence system may select at least a path rule from among a plurality of predefined path rules or may generate a path rule dynamically (or in real time). Further, the electronic device 1000 may use a hybrid system to provide a path rule.

According to an embodiment, the electronic device 1000 may perform the action and display a screen corresponding to the state of the electronic device 1000 performing the action on a display. In another example, the electronic device 1000 may perform the action and not display the result of the action on the display. The electronic device 1000 may perform, for example, a plurality of actions and display only the result of only some of the plurality of actions on the display. The electronic device 1000 may display, for example, only the result of the last sequence action on the display. In another example, the electronic device 1000 may receive a user input and display the result of the action at the corresponding time point on the display.

The personal information server 3000 may include a database storing user information. For example, the personal information server 3000 may receive user information (for example, context information and app execution) from the electronic device 1000 and store the user information in the database. The personal information server 3000 may transmit the user information to the intelligent server 2000 through the communication network and support a function (for example, generating a path rule for the user input) of the intelligent server 2000. According to an embodiment, the electronic device 1000 may receive user information from the personal information server 3000 through the communication network and use the same as information for managing the database.

The offer server 4000 may include a database storing introduction of a function or an application within the terminal or information on a function to be provided. For example, the offer server 4000 may receive user information of the electronic device 1000 from the personal information server 3000 and include a database for a function which can be used by the user. The electronic device 1000 may receive information on a function to be provided from the offer server 4000 through the communication network and provide information to the user.

Figure 1C:
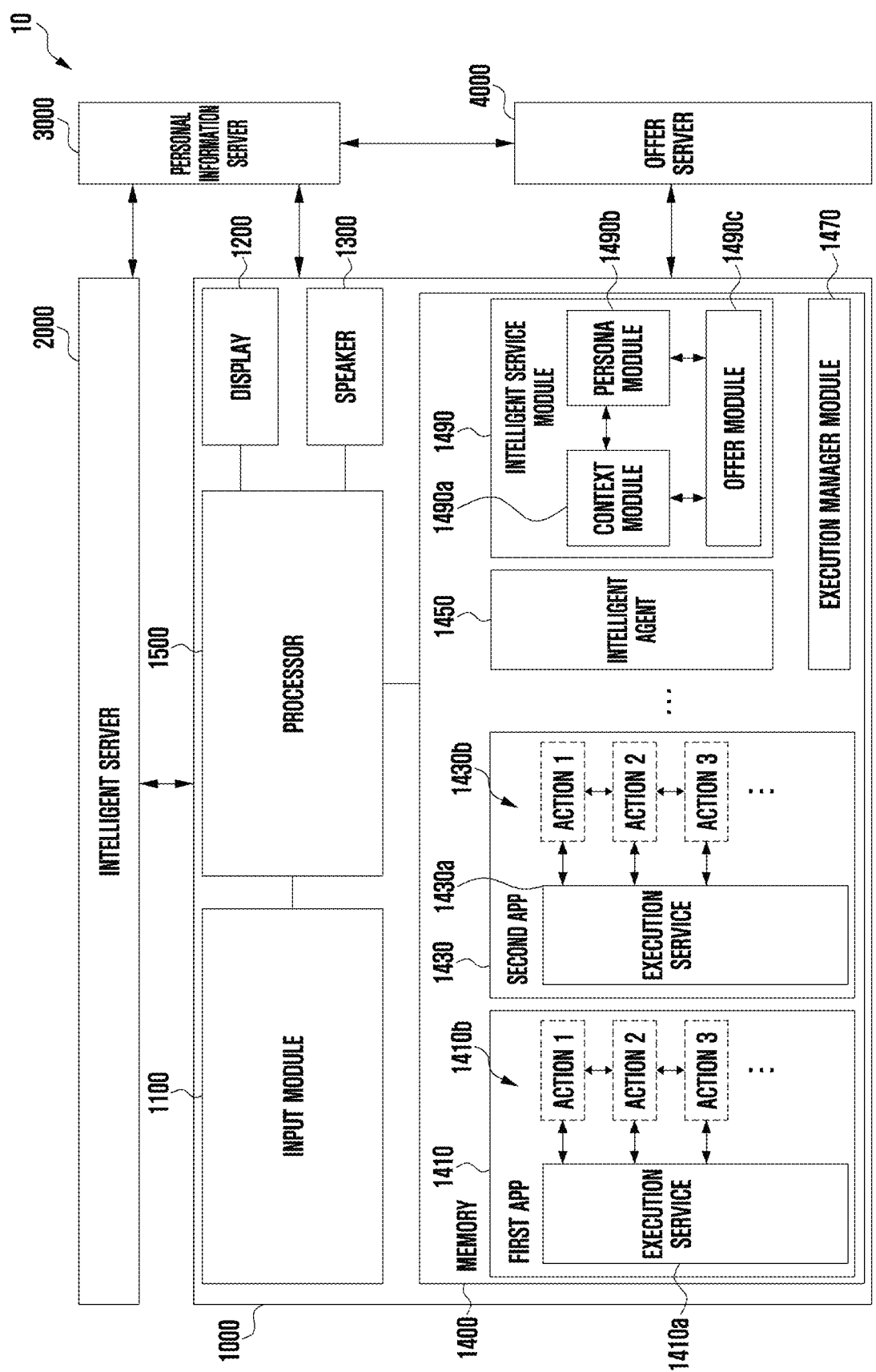
FIG. 1C illustrates an electronic device of an integrated intelligence system according to an embodiment.

FIG. 1C illustrates an electronic device of an integrated intelligence system according to an embodiment.

Referring to FIG. 1C, the electronic device 1000 may include an input module 1100, a display 1200, a speaker 1300, a memory 1400, or a processor 1500. At least some elements (for example, the input module 1100, the display 1200, the speaker 1300, or the memory 1400) of the electronic device 1000 may be electrically or functionally connected to the processor 1500. The electronic device 1000 may further include a housing, and the elements of the electronic device 1000 may be located within the housing or on the housing. The electronic device 1000 may further include a communication circuit located within the housing. The electronic device 1000 may transmit and receive data to and from an external server (for example, the intelligent server 2000) through the communication circuit. According to various embodiments, the electronic device 1000 may be named an electronic device.

The input module 1100 according to an embodiment may receive a user input from the user. For example, the input module 1100 may receive user input from a connected external device (for example, a keyboard or a headset). In another example, the input module 1100 may include a touch screen (for example, a touch screen display) coupled to the display 1200. In another example, the input module 1100 may include a hardware key (or a physical key) located in the electronic device 1000 (or the housing of the electronic device 1000).

According to an embodiment, the input module 1100 may include a microphone capable of receiving a user utterance as a voice signal. For example, the input module 1100 may include a speech input system and receive a user utterance as a voice signal through the speech input system. At least a portion of the microphone may be exposed through, for example, an area (for example, a first area) of the housing. According to an embodiment, the microphone may be controlled to be in a state (for example, always on) in which the microphone is always driven to receive an input (for example, a voice input) according to a user's utterance or controlled to be driven when a user control is applied to a hardware key (for example, a hardware key 1120 of FIG. 1D) provided to an area of the electronic device 1000. The user control may include a press control or a press and hold control of the hardware key 1120.

The display 1200 according to an embodiment may display an image, a video, and/or an execution screen of an application. For example, the display 1200 may display a Graphic User Interface (GUI) of an app. According to an embodiment, at least a portion of the display 1200 may be exposed through an area (for example, a second area) of the housing in order to receive an input (for example, a touch input or a drag input) by a user's body (for example, a finger).

According to an embodiment, the speaker 1300 may output a voice signal. For example, the speaker 1300 may output a voice signal generated within the electronic device 1000 or received from an external device (for example, an intelligent server (intelligent server 2000 of FIG. 1B)). According to an embodiment, in connection with efficiency of the above-described function, at least a portion of the speaker 1300 may be exposed through an area (for example, a third area) of the housing.

According to an embodiment, the memory 1400 may store a plurality of apps (application programs 1410 and 1430). The plurality of apps 1410 and 1430 may be, for example, programs for performing functions corresponding to user inputs. According to an embodiment, the memory 1400 may store the intelligent agent 1450, the execution manager module 1470, or the intelligent service module 1490. The intelligent agent 1450, the execution manager module 1470, or the intelligent service module 1490 may be frameworks (or application frameworks) for processing, for example, received user input (for example, user utterance).

According to an embodiment, the memory 1400 may include a database that may store information required for recognizing the user input. For example, the memory 1400 may include a log database for storing log information. In another example, the memory 1400 may include a persona database for storing user information.

According to an embodiment, the memory 1400 may store the plurality of apps 1410 and 1430, and the plurality of apps 1410 and 1430 may be loaded and operated. For example, the plurality of apps 1410 and 1430 stored in the memory 1400 may be loaded and executed by the execution manager module 1470. The plurality of apps 1410 and 1430 may include execution service modules 1410a and 1430a for performing functions. According to an embodiment, the plurality of apps 1410 and 1430 may perform a plurality of actions 1410b and 1430b (for example, the sequence of states) through the execution service modules 1410a and 1430a in order to perform functions. In other words, the execution service modules 1410a and 1430a may be activated by the execution manager module 1470 of the processor 1500 and perform the plurality of actions 1410b and 1430b.

According to an embodiment, when the actions 1410b and 1430b of the apps 1410 and 1430 are performed, execution state screens according to execution of the actions 1410b and 1430b may be displayed on the display 1200. The execution state screens may be, for example, screens in the state in which the actions 1410b and 1430b are completed. In another example, the execution state screens may be screens in the state in which execution of the actions 1410b and 1430b are stopped (partial landing) (for example, in the state in which a parameter required for the actions 1410b and 1430b is not input).

The execution service modules 1410a and 1430a according to an embodiment may perform the actions 1410b and 1430b according to a path rule. For example, the execution service modules 1410a and 1430a may be activated by the execution manager module 1470, receive an execution request from the execution manager module 1470 according to the path rule, and perform the actions 1410b and 1430b in response to the execution request, so as to perform functions of the apps 1410 and 1430. When the actions 1410b and 1430b are completed, the execution service modules 1410a and 1430a may transmit completion information to the execution manager module 1470.

According to an embodiment, when the plurality of actions 1410b and 1430b are performed by the apps 1410 and 1430, the plurality of actions 1410b and 1430b may be sequentially performed. When one action (for example, action 1 of the first app 1410 and action 1 of the second app 1430) is completely performed, the execution service modules 1410a and 1430a may open the next action (for example, action 2 of the first app 1410 and action 2 of the second app 1430) and transmit completion information to the execution manager module 1470. Here, opening a predetermined action may be understood to be transitioning the predetermined action to an executable state or preparing for execution of the predetermined action. In other words, when the predetermined action is not open, the corresponding action cannot be executed. When receiving the completion information, the execution manager module 1470 may transmit a request for performing the next action (for example, action 2 of the first app 1410 and action 2 of the second app 1430) to the execution service modules 1410a and 1430a. According to an embodiment, when the plurality of apps 1410 and 1430 are executed, the plurality of apps 1410 and 1430 may be sequentially executed. For example, when execution of the last action of the first app 1410 (for example, action 3 of the first app 1410) is completed and completion information is received, the execution manager module 1470 may transmit the first action of the second app 1430 (for example, action 1 of the second app 1430) to the execution service 1430a.

According to an embodiment, when the plurality of actions 1410b and 1430b are performed by the apps 1410 and 1430, a result screen according to execution of each of the plurality of performed actions 1410b and 1430b may be displayed on the display 1200. According to an embodiment, only some of the plurality of result screens according to the execution of the plurality of performed actions 1410b and 1430b may be displayed on the display 1200.

According to an embodiment, the memory 1400 may store an intelligent app (for example, a voice recognition app) linked to the intelligent agent 1450. The app linked to the intelligent agent 1450 may receive and process a user's utterance as a voice signal. According to an embodiment, the app linked to the intelligent agent 1450 may operate according to a specific input (for example, an input through a hardware key, an input through a touch screen, or a specific voice input) input through the input module 1100.

According to an embodiment, the intelligent agent 1450, the execution manager module 1470, or the intelligent service module 1490 stored in the memory 1400 may be executed by the processor 1500. The function of the intelligent agent 1450, the execution manager module 1470, or the intelligent service module 1490 may be implemented by the processor 1500. The function of the intelligent agent 1450, the execution manager module 1470, or the intelligent service module 1490 will be described with reference to the operation of the processor 1500. According to an embodiment, the intelligent agent 1450, the execution manager module 1470, or the intelligent service module 1490 stored in the memory 1400 may be implemented as not only software but also hardware.

According to an embodiment, the processor 1500 may control the overall operation of the electronic device 1000. For example, the processor 1500 may receive a user input by controlling the input module 1100. The processor 1500 may display an image by controlling the display 1200. The processor 1500 may output a voice signal by controlling the speaker 1300. The processor 1500 may execute a program and load or store required information by controlling the memory 1400.

According to an embodiment, the processor 1500 may execute the intelligent agent 1450, the execution manager module 1470, or the intelligent service module 1490 stored in the memory 1400. Accordingly, the processor 1500 may implement the function of the intelligent agent 1450, the execution manager module 1470, or the intelligent service module 1490.

According to an embodiment, the processor 1500 may generate a command for executing an app on the basis of a voice signal received as a user input by executing the intelligent agent 1450. According to an embodiment, the processor 1500 may execute the apps 1410 and 1430 stored in the memory 1400 according to the generated command by executing the execution manager module 1470. According to an embodiment, the processor 1500 may manage user information by executing the intelligent service module 1490 and process user input on the basis of the user information.

The processor 1500 may transmit the user input received through the input module 1100 to the intelligent server 2000 by executing the intelligent agent 1450 and process the user input through the intelligent server 2000.

According to an embodiment, the processor 1500 may preprocess the user input before transmitting the user input to the intelligent server 2000 by executing the intelligent agent 1450. According to an embodiment, in order to preprocess the user input, the intelligent agent 1450 may include an adaptive echo canceller (AEC) module, a noise suppression (NS) module, an end-point detection (EPD) module, or an automatic gain control (AGC) module. The AEC may remove an echo from the user input. The NS module may suppress background noise included in the user input. The EPD module may detect an end point of the user voice included in the user input and discover a part having the user voice on the basis of the detected end point. The AGC module may recognize the user input and control a volume of the user input to properly process the recognized user input. The processor 1500 may execute all of the preprocessing configurations for the performance according to an embodiment, but the processor 1500 may execute only some of the preprocessing configurations to operate with low power according to another embodiment.

According to an embodiment, the intelligent agent 1450 may execute a wake-up recognition module stored in the memory 1400 to recognize a user call. Accordingly, the processor 1500 may recognize a user's wake-up command through the wake-up recognition module and, when the wake-up command is received, execute the intelligent agent 1450 for receiving the user input. The wake-up recognition module may be implemented as a low-power processor (for example, a processor included in an audio codec). According to an embodiment, the processor 1500 may execute the intelligent agent 1450 when receiving the user input through a hardware key. When the intelligent agent 1450 is executed, an intelligent app (for example, a voice recognition app) linked to the intelligent agent 1450 may be executed.

According to an embodiment, the intelligent agent 1450 may include a voice recognition module for executing the user input. The processor 1500 may recognize the user input for performing the operation in the app through the voice recognition module. For example, the processor 1500 may recognize a limited user (voice) input (for example, the utterance "click" for performing a photographing action when a camera app is executed) for performing an action such as the wake-up command in the apps 1410 and 1430 through the voice recognition module. The processor 1500 may recognize a user command which can be processed within the electronic device 1000 through the voice recognition module by assisting the intelligent server 2000 and rapidly process the user command. According to an embodiment, the voice recognition module of the intelligent agent 1450 for executing the user input may be implemented by an app processor.

According to an embodiment, the intelligent agent 1450 and the voice recognition module (including the voice recognition module of the wake-up module) may recognize the user input through an algorithm for recognizing a voice. The algorithm used for recognizing the voice may be at least one of, for example, a hidden Markov model (HMM) algorithm, an artificial neural network (ANN) algorithm, or a dynamic time warping (DTW) algorithm.

According to an embodiment, the processor 1500 may convert a user voice input into text data by executing the intelligent agent 1450. For example, the processor 1500 may transmit a user voice to the intelligent server 2000 through the intelligent agent 1450 and receive text data corresponding to the user voice from the intelligent server 2000. Accordingly, the processor 1500 may display the converted text data on the display 1200.

According to an embodiment, the processor 1500 may receive a path rule from the intelligent server 2000 by executing the intelligent agent 1450. According to an embodiment, the processor 1500 may transmit the path rule to the execution manager module 1470 through the intelligent agent 1450.

According to an embodiment, the processor 1500 may transmit an execution result log according to the path rule received from the intelligent server 2000 to the intelligent service module 1490 by executing the intelligent agent 1450, and the transmitted execution result log may be accumulated in user preference information of the persona module (persona manager) 1490*b* and managed.

According to an embodiment, the processor 1500 may receive the path rule from the intelligent agent 1450 by executing the execution manager module 1470, execute the apps 1410 and 1430, and allow the apps 1410 and 1430 to perform the actions 1410*b* and 1430*b* included in the path rule. For example, the processor 1500 may transmit command information (for example, path rule information) for performing the actions 1410*b* and 1430*b* by the apps 1410 and 1430 through the execution manager module 1470 and receive completion information of the actions 1410*b* and 1430*b* from the apps 1410 and 1430.

According to an embodiment, the processor 1500 may transmit command information (for example, path rule information) for performing the actions 1410*b* and 1430*b* of the apps 1410 and 1430 between the intelligent agent 1450 and the apps 1410 and 1430 by executing the execution manager module 1470. The processor 1500 may bind the apps 1410 and 1430 to be executed according to the path rule through the execution manager module 1470 and transmit command information (for example, path rule information) of the actions 1410*b* and 1430*b* included in the path rule to the apps 1410 and 1430. For example, the processor 1500 may sequentially transmit the actions 1410*b* and 1430*b* included in the path rule to the apps 1410 and 1430 through the execution manager module 1470 and sequentially perform the actions 1410*b* and 1430*b* of the apps 1410 and 1430 according to the path rule.

According to an embodiment, the processor 1500 may manage execution states of the actions 1410*b* and 1430*b* of the apps 1410 and 1430 by executing the execution manager module 1470. For example, the processor 1500 may receive information on the execution states of the actions 1410*b* and 1430*b* from the apps 1410 and 1430 through the execution manager module 1470. When the execution states of the actions 1410*b* and 1430*b* are, for example, stopped states (partial landing) (for example, when a parameter required for the actions 1410*b* and 1430*b* is not input), the processor 1500 may transmit information on the stopped states to the intelligent agent 1450 through the execution manager module 1470. The processor 1500 may make a request for an input of required information (for example, parameter information) to the user on the basis of the received information through the intelligent agent 1450. When the execution states of the actions 1410*b* and 1430*b* are, for example, the operation state, the processor 1500 may receive a user utterance through the intelligent agent 1450. The processor 1500 may transmit information on the apps 1410 and 1430 being executed and information on the execution states of the apps 1410 and 1430 to the intelligent agent 145 through the execution manager module 1470. The processor 1500 may transmit the user utterance to the intelligent server 2000 through the intelligent agent 1450. The processor 1500 may receive parameter information of the user utterance from the intelligent server 2000 through the intelligent agent 1450. The processor 1500 may transmit the received parameter information to the execution manager module 1470 through the intelligent agent 1450. The execution manager module 1470 may change the parameter of the actions 1410*b* and 1430*b* to a new parameter on the basis of the received parameter information.

According to an embodiment, the processor 1500 may transmit parameter information included in the path rule to the apps 1410 and 1430 by executing the execution manager module 1470. When the plurality of apps 1410 and 1430 are sequentially executed according to the path rule, the execution manager module 1470 may transfer parameter information included in the path rule from one app to another app.

According to an embodiment, the processor 1500 may receive a plurality of path rules by executing the execution manager module 1470. The processor 1500 may select a plurality path rules on the basis of the user utterance through the execution manager module 1470. For example, the user utterance specifies the app 1410 to perform the action 1410*a* through the execution manager module 1470, but if another app 1430 to perform the remaining action 1430*b* is not specified, the processor 1500 may receive a plurality of different path rules for executing the same app 1410 (for example, a gallery app) to perform the action 1410*a* and executing the other app 1430 (for example, a message app or a telegram app) to perform the remaining action 1430*b*. The processor 1500 may perform the same actions 1410*b* and 1430*b* (for example, the same successive actions 1410*b* and 1430*b*) of the plurality of path rules through, for example, the execution manager module 1470. When the same actions are performed, the processor 1500 may display a state screen for selecting different apps 1410 and 1430 included in the plurality of path rules through the execution manager module 1470 on the display 1200.

According to an embodiment, the intelligent service module 1490 may include a context module 1490*a*, a persona module 1490*b*, or an offer module 1490*c*.

The context module 1490*a* may collect the current states of the apps 1410 and 1430 from the apps 1410 and 1430. For example, the context module 1490*a* may receive context information indicating the current states of the apps 1410 and 1430 and collect the current states of the apps 1410 and 1430.

The persona module 1490*b* may manage personal information of the user using the electronic device 1000. For example, the persona module 1490*b* may collect usage information and the performance result of the electronic device 1000 and manage the personal information of the user.

The offer module 1490*c* may predict a user's intent and recommend a command to the user. For example, the offer module 1490*c* may recommend a command to the user in consideration of the current state of the user (for example, time, place, situation, and app).

Figure 1D:
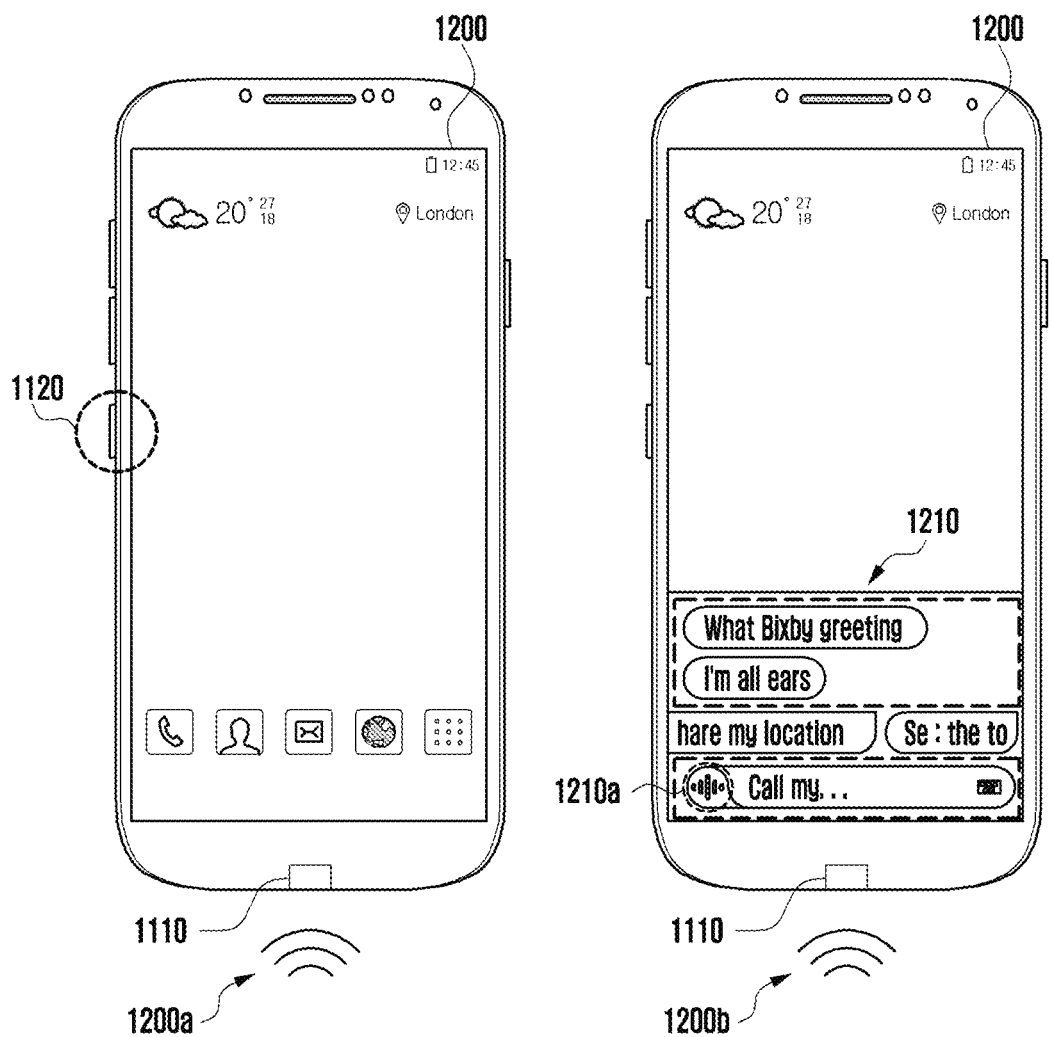
FIG. 1D illustrates an intelligent app execution form of an electronic device according to an embodiment.

FIG. 1D illustrates an intelligent app execution form of an electronic device according to an embodiment.

Referring to FIG. 1D, the electronic device 1000 may include a hardware button 1120 functioning as an interface for receiving user input. The hardware button 112 may be disposed in, for example, an area which a user body (for example, a finger) easily reaches on the housing of the electronic device 1000, and at least a portion thereof may be exposed to the outside of the housing. According to an embodiment, the electronic device 1000 may receive user input applied to the hardware button 1120 and execute an intelligent app (for example, a voice recognition app) linked to the intelligent agent (1450 of FIG. 1C).

When receiving the user input through the hardware key 1120, the electronic device 1000 may display a user interface (UI) 1210 of the intelligent app on the display 1200. The user may touch a voice recognition button 1210*a* on the UI 1210 of the intelligent app in order to input a voice 1200*b* in the state in which the UI 1210 of the intelligent app is displayed on the display 1200. In another example, the user may input a voice 1200*a* by continuously pressing the hardware key 1120 in order to input the voice 1200*a*.

According to an embodiment, the electronic device 1000 may execute the intelligent app through the microphone 1110. For example, when a predetermined voice (for example, "wake up!") is input through the microphone 1110, the electronic device 1000 may display the UI 1210 of the intelligent app on the display 1200.

Figure 1E:
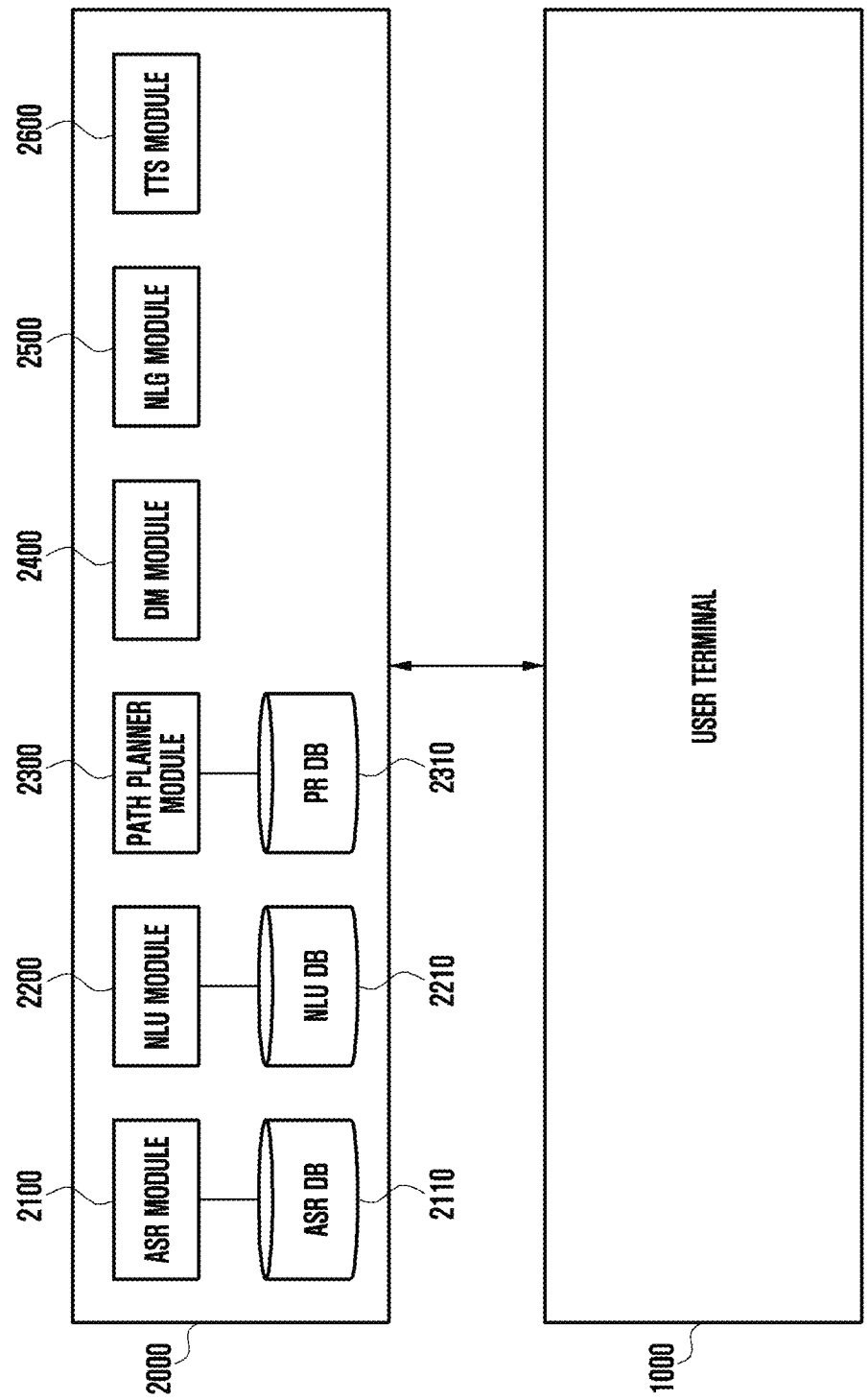
FIG. 1E illustrates an intelligent server of an integrated intelligence system according to an embodiment.

FIG. 1E illustrates an intelligent server of an integrated intelligence system according to an embodiment.

Referring to FIG. 1E, the intelligence server 2000 may include an automatic speech recognition (ASR) module 2100, a natural language understanding (NLU) module 2200, a path planner module 2300, a dialogue manager (DM) module 2400, a natural language generator (NLG) module 2500, or a text-to-speech (TTS) module 2600.

According to an embodiment, the intelligent server 2000 may include a communication circuit, a memory, and a processor. The processor may drive the ASR module 2100, the NLU module 2200, the path planner module 2300, the DM module 2400, the NLG module 2500, and TTS module 2600 by executing an instruction stored in the memory. The intelligent server 2000 may transmit and receive data (or information) to and from an external electronic device (for example, the electronic device 1000) through the communication circuit.

The NLU module 2200 or the path planner module 2300 of the intelligent server 2000 may generate a path rule.

According to an embodiment, the ASR module 2100 may convert the user input received from the electronic device 1000 into text data. For example, the ASR module 2100 may include an utterance recognition module. The utterance recognition module may include an acoustic model and a language model. For example, the acoustic model may include information related to vocalization, and the language model may include information on unit phoneme information and a combination of unit phoneme information. The utterance recognition module may convert a user utterance into text data on the basis of information related to vocalization and information on unit phoneme information. Information on the acoustic model and the language model may be stored in, for example, an automatic speech recognition database (ASR DB) 2110.

According to an embodiment, the NLU module 2200 may detect a user's intention by performing syntactic analysis or semantic analysis. The syntactic analysis may divide the user input into syntactic units (for example, words, phrases, or morphemes) and may detect which syntactic element belongs to the divided units. The semantic analysis may be performed using semantic matching, rule matching, or formula matching. Accordingly, the NLU module 2200 may acquire a domain and an intent of the user input, or a parameter (or a slot) required for expressing the intent.

According to an embodiment, the NLU module 2200 may determine a user's intent and a parameter using a matching rule divided into the domain, the intent, and the parameter required for detecting the intent. For example, one domain (for example, alarm) may include a plurality of intents (for example, alarm setting or alarm release), and one intent may include a plurality of parameters (for example, time, the number of repetitions, and an alarm sound). A plurality of rules may include, for example, one or more necessary element parameters. The matching rule may be stored in a natural language understanding database (NLU DB) 2210.

According to an embodiment, the LNU module 2200 may detect a meaning of a word extracted from the user input on the basis of linguistic features (for example, syntactic elements) such as morphemes or phrases and determine a user's intent by matching the detected meaning of the word and a domain and an intent. For example, the NLU module 2200 may determine a user's intent by calculating how much the word extracted from the user input is included in each domain and intent. According to an embodiment, the NLU module 2200 may determine a parameter of the user input through the word which is the basis of detecting the intent. According to an embodiment, the NLU module 2200 may determine the user's intent through the NLU DB 2210 storing linguistic features for detecting the intent of the user input. According to another embodiment, the NLU module 2200 may determine the user's intent through a personal language model (PLM). For example, the NLU module 2200 may determine the user's intent on the basis of personalized information (for example, a contact list or a music list). The personalized language model may be stored in, for example, the NLU DB 2210. According to an embodiment, not only the ASR module 2100 but also the NLU module 2200 may recognize a user's voice with reference to a personal language model stored in the NLU DB 2210.

According to an embodiment, the NLU module 2200 may generate a path rule on the basis of the intent and the parameter of the user input. For example, the NLU module 2200 may select an app to be executed on the basis of the intent of the user input and determine an action to be performed by the selected app. The NLU module 2200 may determine a parameter corresponding to the determined action and generate a path rule. According to an embodiment, the path rule generated by the NLU module 2200 may include information on an app to be executed, an action (for example, at least one state) to be executed by the app, and a parameter required for performing the action.

According to an embodiment, the NLU module 2200 may generate one path rule or a plurality of path rules on the basis of the intent and the parameter of the user input. For example, the NLU module 2200 may receive a path rule set corresponding to the electronic device 1000 from the path planner module 2300 and map the intent of the user input and the parameter to the received path rule set so as to determine path rules.

According to another embodiment, the NLU module 2200 may determine an app to be executed on the basis of the intent of the user input and the parameter, an action to be executed by the app, and a parameter required for performing the action so as to generate one path rule or a plurality of path rules. For example, the NLU module 2200 may generate a path rule by arranging the app to be executed and the action to be executed by the app in the form of ontology or a graph model according to the intent of the user input on the basis of information on the electronic device 1000. The generated path rule may be stored in a path rule database (PR DB) 2310 through, for example, the path planner module 2300. The generated path rule may be added to the path rule set of the database 2310.

According to an embodiment, the NLU module 2200 may select at least one path rule from the plurality of generated path rules. For example, the NLU module 2200 may select an optimal path rule from the plurality of path rules. In another example, when only some operations are specified, the NLU module 2200 may select a plurality of path rules on the basis of a user utterance. The NLU module 2200 may determine one path rule from the plurality of path rules by an additional user input.

According to an embodiment, the NLU module 2200 may transmit the path rule to the electronic device 1000 in response to a request for user input. For example, the NLU module 2200 may transmit one path rule corresponding to the user input to the electronic device 1000. In another example, the NLU module 2200 may transmit a plurality of path rules corresponding to the user input to the electronic device 1000. When only some operations are specified on the basis of a user's utterance, the plurality of path rules may be generated by the NLU module 2200.

According to an embodiment, the path planner module 2300 may select at least one path rule from the plurality of path rules.

According to an embodiment, the path planner module 2300 may transmit a path rule set including a plurality of path rules to the NLU module 2200. The plurality of path rules included in the path rule set may be stored in the path rule database 2310 connected to the path planner module 2300 in the form of a table. For example, the path planner module 2300 may transmit a path rule set corresponding to information on the electronic device 1000 (for example, OS information and app information) received from the intelligent agent 1450 to the NLU module 2200. For example, the table stored in the path rule database 2310 may be stored for each domain or each version of the domain.

According to an embodiment, the path planner module 2300 may select one path rule or a plurality of path rules from the path rule set, and transmit the selected path rule or path rules to the NLU module 2200. For example, the path planner module 2300 may map the user intent and the parameter to the path rule set corresponding to the electronic device 1000, select one path rule or a plurality of path rules, and transmit the selected path rule(s) to the NLU module 2200.

According to an embodiment, the path planner module 2300 may generate one path rule or a plurality of path rules on the basis of the user's intent and the parameter. For example, the path planner module 2300 may determine an app to be executed on the basis of the user's intent and the parameter and an operation to be executed by the app, and generate one path rule or a plurality of path rules. According to an embodiment, the path planner module 2300 may store the generated path rule in the path rule database 2310.

According to an embodiment, the path planner module 2300 may store the path rule generated by the NLU module 2200 in the path rule database 2310. The generated path rule may be added to the path rule set stored in the path rule database 2310.

According to an embodiment, the table stored in the path rule database 2310 may include a plurality of path rules or a plurality of path rule sets. The plurality of path rules or the plurality of path rule sets may reflect the kind, version, type, or characteristic of a device performing each path rule.

According to an embodiment, the DM module 2400 may determine whether the user's intent detected by the NLU module 2200 is clear. For example, the DM module 2400 may determine whether the user's intent is clear on the basis of whether parameter information is sufficient. The DM module 2400 may determine whether the parameter detected by the NLU module 2200 is enough to perform a task. According to an embodiment, when the user intent is not clear, the dialog manager module 2400 may transmit a feedback making a request for required information to the user. For example, the DM module 2400 may transmit a feedback making a request for information on the parameter for detecting the user intent.

According to an embodiment, the DM module 2400 may include a content provider module. When the operation cam be performed on the basis of the intent and the parameter detected by the NLU module 2200, the content provider module may generate a result of the task corresponding to the user input. According to an embodiment, the DM module 2400 may transmit the result generated by the content provision module to the electronic device 1000 in response to the user input.

According to an embodiment, the NLG module 2500 may convert predetermined information to have the text form. The information converted into the form of text may be the form of a natural language speech. The predetermined information may be, for example, information on an additional input, information informing of completion of an operation corresponding to a user input, or information informing of an additional user input (for example, feedback information of a user input). The information converted into the text form may be transmit to the electronic device 1000 and displayed on the display 1200 or may be transmitted to the TTS module 2600 and converted into the voice form.

According to an embodiment, the TTS module 2600 may convert information in the text form into information in the voice form. The TTS module 2600 may receive information in the text form from the NLG module 2500, and convert the information in the text form into information in the voice form and transmit the information in the voice form to the electronic device 1000. The electronic device 1000 may output the information in the voice form to the speaker 1300.

According to an embodiment, the NLU module 2200, the path planner module 2300, and the DM module 2400 may be implemented as a single module. For example, the NLU module 2200, the path planner module 2300, and the DM module 2400 may be implemented as a single module to determine a user's intent and a parameter and generate a response (for example, a path rule) corresponding to the determined user's intent and parameter. Accordingly, the generated response may be transmitted to the electronic device 1000.

Figure 1F:
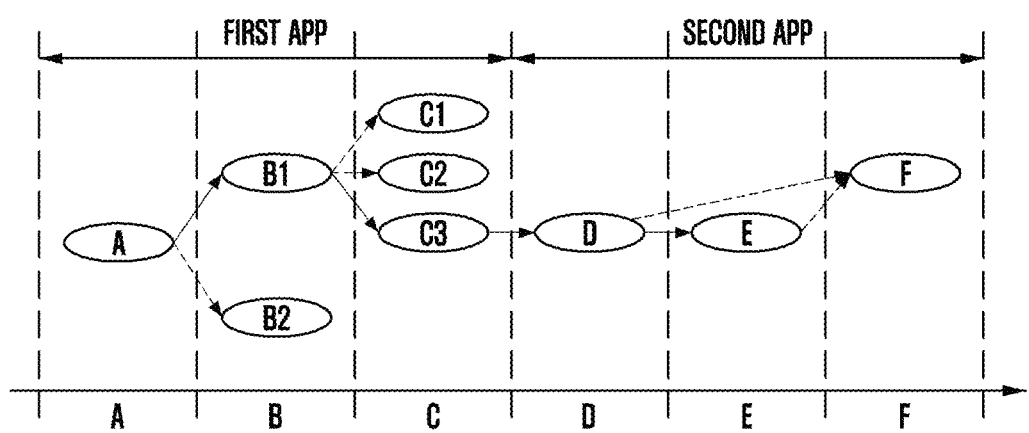
FIG. 1F illustrates the form in which an intelligent server generates a path rule according to an embodiment.

FIG. 1F illustrates the form in which an intelligent server generates a path rule according to an embodiment.

Referring to FIG. 1F, the NLU module 2200 according to an embodiment may identify a function of an app as one action (for example, one of states A to F) and store the action in the path rule database 2310. For example, the NLU module 2200 may store a path rule set including a plurality of path rules (A-B1-C1, A-B1-C2, A-B1-C3-D-F, and A-B1-C3-D-E-F) classified by one operation (for example, the state) in the path rule database 2310.

According to an embodiment, the path rule database 2310 of the path planner module 2300 may store a path rule set for performing the function of the app. The path rule set may include a plurality of path rules including a plurality of actions (for example, sequence of states). In the plurality of path rules, actions executed by a parameter input into each of a plurality of actions may be sequentially arranged. According to an embodiment, the plurality of path rules may be configured in the form of ontology or graph model and stored in the path rule database 2310.

According to an embodiment, the NLU module 2200 may select an optimal path rule (A-B1-C3-D-F) from the plurality of path rules (A-B1-C1, A-B1-C2, A-B1-C3-D-F, and A-B1-C3-D-E-F) corresponding to the intent of the user input and the parameter.

According to an embodiment, when there is no path rule that completely matches the user input, the NLU module 2200 may transmit a plurality of path rules to the electronic device 1000. For example, the NLU module 2200 may select a path rule (for example, A-B1) partially corresponding to the user input. The NLU module 2200 may select one or more path rules (for example, A-B1-C1, A-B1-C2, A-B1-C3-D-F, and A-B1-C3-D-E-F) including a path rule (for example, A-B1) partially corresponding to the user input and transmit the selected path rules to the electronic device 1000.

According to an embodiment, the NLU module 2200 may select one of a plurality of path rules on the basis of an additional input of the electronic device 1000 and transmit the selected one path rule to the electronic device 1000. For example, the NLU module 2200 may select one path rule (for example, A-B1-C3-D-F) from among a plurality of path rules (for example, A-B1-C1, A-B1-C2, A-B1-C3-D-F, and A-B1-C3-D-E-F) according to the user input (for example, input for selecting C3) additionally input into the electronic device 1000 and transmit the selected path rule to the electronic device 1000.

According to another embodiment, the NLU module 2200 may determine a user intent and a parameter corresponding to the user input (for example, input for selecting C3) additionally input into the electronic device 1000 through the NLU module 2200 and transmit the determined user intent or parameter to the electronic device 1000. The electronic device 1000 may select one path rule (for example, A-B1-C3-D-F) from among a plurality of path rules (for example, A-B1-C1, A-B1-C2, A-B1-C3-D-F, and A-B1-C3-D-E-F) on the basis of the transmitted intent or parameter.

Accordingly, the electronic device 1000 may complete the actions of the apps 1410 and 1430 by the one selected path rule.

According to an embodiment, when a user input having lack information is received by the intelligent server 2000, the NLU module 2200 may generate a path rule partially corresponding to the received user input. For example, the NLU module 2200 may transmit the partially corresponding path rule to the intelligent agent 1450. The processor 1500 may execute the intelligent agent 1450 to receive the path rule and transmit the partially corresponding path rule to the execution manager module 1470. The processor 1500 may execute the first app 1410 according to the path rule through the execution manager module 1470. The processor 1500 may transmit information on a lack parameter to the intelligent agent 1450 while executing the first app 1410 through the execution manager module 1470. The processor 1500 may make a request for an additional input to the user on the basis of the information on the lack parameter through the intelligent agent 1450. When the additional input is received from the user through the intelligent agent 1450, the processor 1500 may transmit the user input to the intelligent server 2000 to process the same. The NLU module 2200 may generate an additional path rule on the basis of an intent of the additionally made user input and parameter information and transmit the path rule to the intelligent agent 1450. The processor 1500 may transmit the path rule to the execution manager module 1470 through the intelligent agent 1450 and execute the second app 1430.

According to an embodiment, when a user input of which some information is omitted is received by the intelligent server 2000, the NLU module 2200 may transmit a user information request to the personal information server 3000. The personal information server 3000 may transmit information on the user having made the user input stored in the persona database to the NLU module 2200. The NLU module 2200 may select a path rule corresponding to a user input of which some operations are omitted on the basis of the user information. Accordingly, although the user input of which some information is omitted is received by the intelligent agent 2000, the NLU module 2200 may receive an additional input by making a request for omitted information or determine a path rule corresponding to the user input on the basis of the user information.

[Table 1] below may show an example of path rules related to tasks requested by the user according to an embodiment.

TABLE 1

| Path rule ID | State | parameter |
| --- | --- | --- |
| Gallery_101 | picture View(25) | NULL |
|  | search View(26) | NULL |
|  | search ViewResult(27) | Location, time |
|  | SearchEmpty SelectedView(28) | NULL |
|  | SearchSelectedView(29) | ContentType, selectall |
|  | CrossShare(30) | anaphora |

Referring to [Table 1], a path rules generated or selected by the intelligent server (the intelligent server 2000 of FIG. 1) according to a user's utterance (for example, "share a photo") may include at least one state (25, 26, 27, 28, 29, and 30). For example, at least one state (for example, at least one operation state of the UE) may correspond to at least one of executing a picture application (PicturesView) (25), executing a picture search function (SearchView) (26), outputting a search result on a display screen (SearchViewResult) (27), outputting a search result obtained by non-selection of a picture on a display screen (SearchEmptySelectedView) (28), outputting a search result obtained by selection of at least one picture on a display screen (SearchSelectedView) (29), or outputting a shared application selection screen (CrossShare) (30). According to an embodiment, parameter information of the path rule may correspond to at least one state. For example, parameter information of the path rule may be included in the state 29 of outputting a search result obtained by selection of at least one picture on a display screen.

The task (for example, "share a photo!") requested by the user may be performed according to the result of the path rule including the sequence of the states 25, 26, 27, 28, and 29.

Figure 1G:
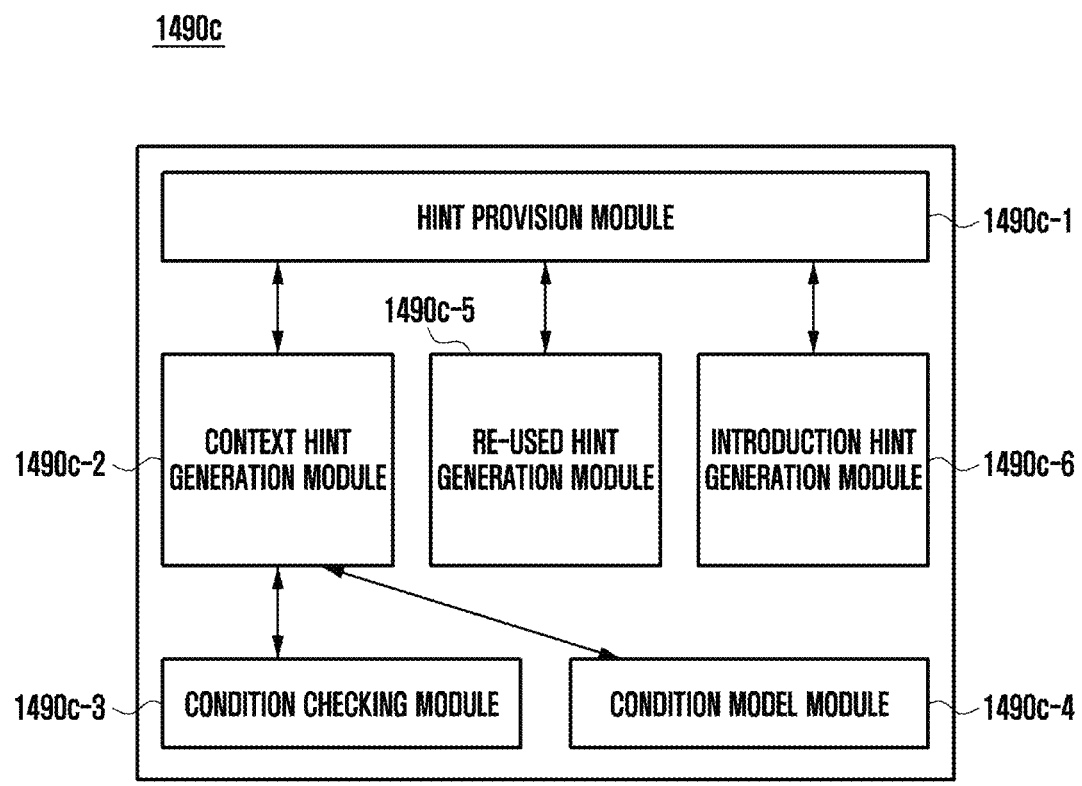
FIG. 1G illustrates an offer module of an intelligent service module according to an embodiment.

FIG. 1G illustrates an offer module of an intelligent service module according to an embodiment.

Referring to FIG. 1G, the offer module 1490c may include a hint provision module 1490c_1, a content hit generation module 1490c_2, a condition checking module 1490c_3, a condition model module 1490c_4, a reused hint generation module 1490c_5, or an introduction hint generation module 1490c_6.

According to an embodiment, the processor 1500 may provide a hint to the user by executing the hint provision module 1490c_1. For example, the processor 1500 may receive a generated hint from the context hint generation module 1490c_2, the reuse hint generation module 1490c_5, or an introduction hint generation module 1490c_6 through the hint provision module 1490c_1 and provide the hint to the user.

According to an embodiment, the processor 1500 may generate a hint which can be recommended according to the current state by executing the condition checking module 1490c_3 or the condition model module 1490c_4. The processor 1500 may receive information corresponding to the current state by executing the condition checking module 1490c_3 and configure a condition model on the basis of the received information by executing the condition model module 1490c_4. For example, the processor 1500 may detect a time, a location, and a situation, and a used app at the time point at which the hint is provided to the user by executing the condition model module 1490c_4 and provide hints having a higher use possibility under the corresponding condition to the user according to a higher priority.

According to an embodiment, the processor 1500 may generate a hint which can be recommended according to a use frequency by executing the reuse hint generation module 1490c_5. For example, the processor 1500 may generate a hint based on a use pattern of the user by executing the reuse hint generation module 1490c_5.

According to an embodiment, the introduction hint generation module 1490c_6 may generate a hint for introducing a new function or a function frequently used by another user to the user. For example, the hint for introducing the new function may include introduction (for example, an operation method) of the intelligent agent 1450.

According to another embodiment, the context hint generation module 1490c_2 the condition checking module 1490c_3, the condition model module 1490c_4, the reuse hint generation module 1490c_5, or the introduction hint generation module 1490c_6 of the offer module 1490c may be included in a personal information server 3000. For example, the processor 1500 may receive a hint from context hint generation module 1490c_2, the reuse hint generation module 1490c_5, or the introduction hint generation module 1490c_6 of the personal information server 3000 of the user through the hint provision module 1490c_1 of the offer module 1490c and provide the received hint to the user.

According to an embodiment, the electronic device 1000 may provide a hint according to a series of processes below. For example, when receiving a hint provision request from the intelligent agent 1450, the processor 1500 may transmit a hint generation request to the context hint generation module 1490c_2 through the hint provision module 1490c_1. When receiving the hint generation request, the processor 1500 may receive information corresponding to the current state from the context module 1490a and the persona module 1490b through the condition checking module 1490c_3. The processor 1500 may transmit the information received through the condition checking module 1490c_3 to the condition model module 1490c_4 and assign a higher priority to a hint having a higher use possibility under the condition among hints provided to the user on the basis of the information through the condition model module 1490c_4. The processor 1500 may identify the condition through the context hint generation module 1490c_2 (⑥) and generate a hint corresponding to the current state. The processor 1500 may transmit the hint generated through the context hint generation module 1490c_2 to the hint provision module 1490c_1. The processor 1500 may arrange the hints according to a predetermined rule through the hint provision module 1490c_1 and transmit the hints to the intelligent agent 1450.

According to an embodiment, the processor 1500 may generate a plurality of context hints through the hint provision module 1490c_1 and designate priorities to the plurality of context hints according a predetermined rule. According to an embodiment, the processor 1500 may first provide the user with a hint having a high priority among the plurality of content hints through the hint provision module 1490c-1.

According to an embodiment, the electronic device 1000 may propose a hint according to the use frequency. For example, when receiving a hint provision request from the intelligent agent 1450, the processor 1500 may transmit a hint generation request to the reused-hint generation module 1490c_5 through the hint provision module 149c-1. When receiving the hint generation request, the processor 1500 may receive user information from the persona module 1490b through the reused-hint generation module 1490c_5. For example, the processor 1500 may receive a path rule included in preference information of the user of the persona module 1490b, a parameter included in the path rule, an execution frequency of an app, and time and space information of the used app through the reused-hint generation module 1490c_5. The processor 1500 may generate a hint corresponding to the received user information through the reused-hint generation module 1490c_5. The processor 1500 may transmit the hint generated through the reused-hint generation module 1490c_5 to the hint provision module 1490c_1. The processor 1500 may arrange the hints through the hint provision module 1490c_1 and transmit the hints to the intelligent agent 1450.

According to an embodiment, the electronic device 1000 may propose a hint for a new function. For example, when receiving a hint provision request from the intelligent agent 1450, the processor 1500 may transmit a hint generation request to the introduction hint generation module 1490c_6 through the hint provision module 1490c_1. The processor 1500 may transmit an introduction hint provision request from the offer server 4000 through the introduction hint generation module 1490c_6 and receive information on a function to be introduced from the offer server 4000. The offer server 4000 may store, for example, the information on the function to be introduced, and a hint list of functions to be introduced may be updated by a service operator. The processor 1500 may transmit the hint generated through the introduction hint generation module 1490c_6 to the hint provision module 1490c_1. The processor 1500 may arrange the hint through the hint provision module 1490c_1 and transmit the hint to the intelligent agent 1450 (⑥).

Accordingly, the processor 1500 may provide the hints generated by the context hint generation module 1490c_2, the reused-hint generation module 1490c_5, or the introduction hint generation module 1490c_6 to the user through the offer module 1490c. For example, the processor 1500 may display the generated hint on an app for operating the intelligent agent 145 through the offer module 1490c and receive an input for selecting the hints from the user through the app.

Figure 2:
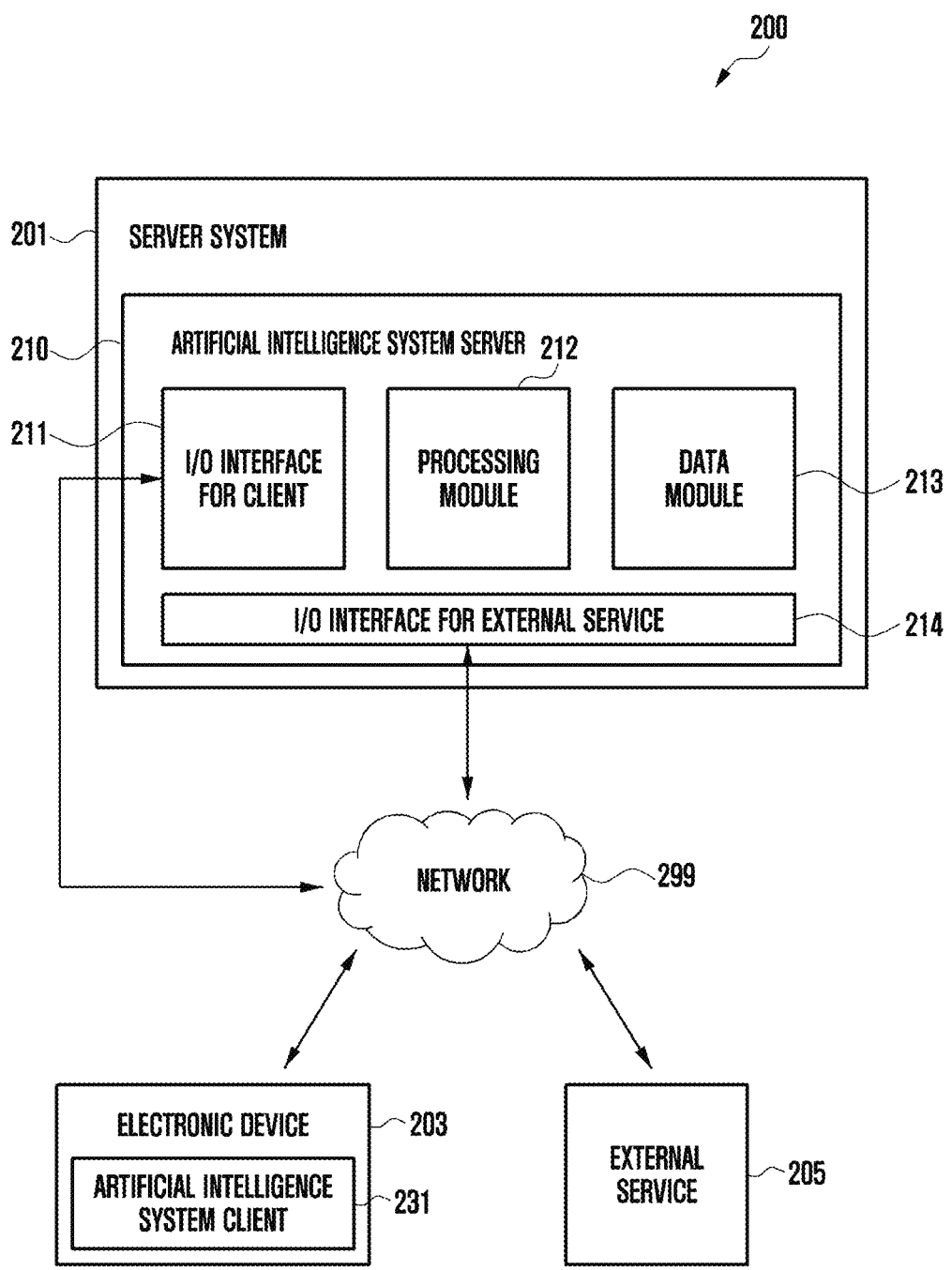
FIG. 2 is a block diagram illustrating a server within a network environment according to various embodiments.

FIG. 2 is a block diagram illustrating a server within a network environment 200 according to various embodiments. The term "artificial intelligence system", "digital assistant", "virtual assistant", "intelligent automation assistant", or "automatic digital assistant" may refer to a predetermined information processing system that analyzes a natural language input in the colloquial and/or text form to infer a user intent and performs actions on the basis of the inferred user intent. For example, in order to operate according to the inferred user intent, the system may perform one or more of identifying a path rule having steps and parameters designed to achieve the inferred user intent, inputting specific requirements from the inferred user intent into a path rule, executing a path rule by loading programs, methods, services, APIs, and others, and generating output responses to the user in the audible form (for example, voice) and/or the visual form.

Specifically, the artificial intelligence system may at least partially accept a user request in the form of a natural language command, a request, a statement, a story, and/or a query. In general, the user request seeks informational response or performance of a task by the artificial intelligence system. A satisfactory response to the user request is to provide one of a requested informational response, performance of a requested task, and a combination thereof.

The artificial intelligence system sometimes interacts with the user through continuous conversation having a plurality of information exchanges during an extended predetermined period of time while the requested task is performed. For requested information or performance of various tasks, there are many different methods of interacting with the artificial intelligence system. Verbal responses are provided, and a digital assistant provides responses in different visual forms or audio forms (for example, as text, warnings, music, videos, or animations) as well as taking programmed actions.

Referring to FIG. 2, the artificial intelligence system may be implemented according to a client-server model. The artificial intelligence system may include an artificial intelligence assistance client 231 implemented in an electronic device 203 (for example, the electronic device 101 of FIG. 1A) and an artificial intelligence system server 210 (for example, the server 108 of FIG. 1A) implemented in a server system 201. The artificial intelligence system client 231 may be implemented in the electronic device 203 and may communicate with the artificial intelligence system server 210 through a network 299. The artificial intelligence system client 231 may provide user-facing input/output processing, and the artificial intelligence system client 231 may communicate with the artificial intelligence system server 210. The artificial intelligence system server 210 may provide a service-side function to the artificial intelligence system client 231 implemented in the electronic device 203. The electronic device 203 of FIG. 2 may be the same as the electronic device 101 of FIG. 1A. The artificial intelligence system server 210 of FIG. 2 may be the same as the sever 108 of FIG. 1A.

The artificial intelligence system server 210 may include an input/output (I/O) interface for client 210, a processing module 212, a data module 213, and an input/output (I/O) interface for external service 214.

The I/O interface for client 211 is for client-facing input/output processing of the artificial intelligence system server 210 and may exchange information with the artificial intelligence system client 231 implemented in the electronic device 203 through the network 299. The processing module 212 may include one or more processing modules, determine a user intent on the basis of natural language input, and use data and modules to perform a task on the basis of the inferred user intent. The data module 213 may include data and a module for performing a task on the basis of the inferred user intent. According to various embodiments, data and a model store a plurality of ontologies (for example, global ontology, local ontology, cultural ontology, and national ontology) maintained by the artificial intelligence system server 210 which are different from the ontology of each user.

The I/O interface for external service 214 may be external service-facing input/output processing that makes a request for information required for the artificial intelligence system server 210 to an external service 205 (for example, Internet or search engine) through the network 299 and exchanges information.

The server system 201 may be implemented on computers of one or more independent data processing devices or a distributed network.

Figure 3:
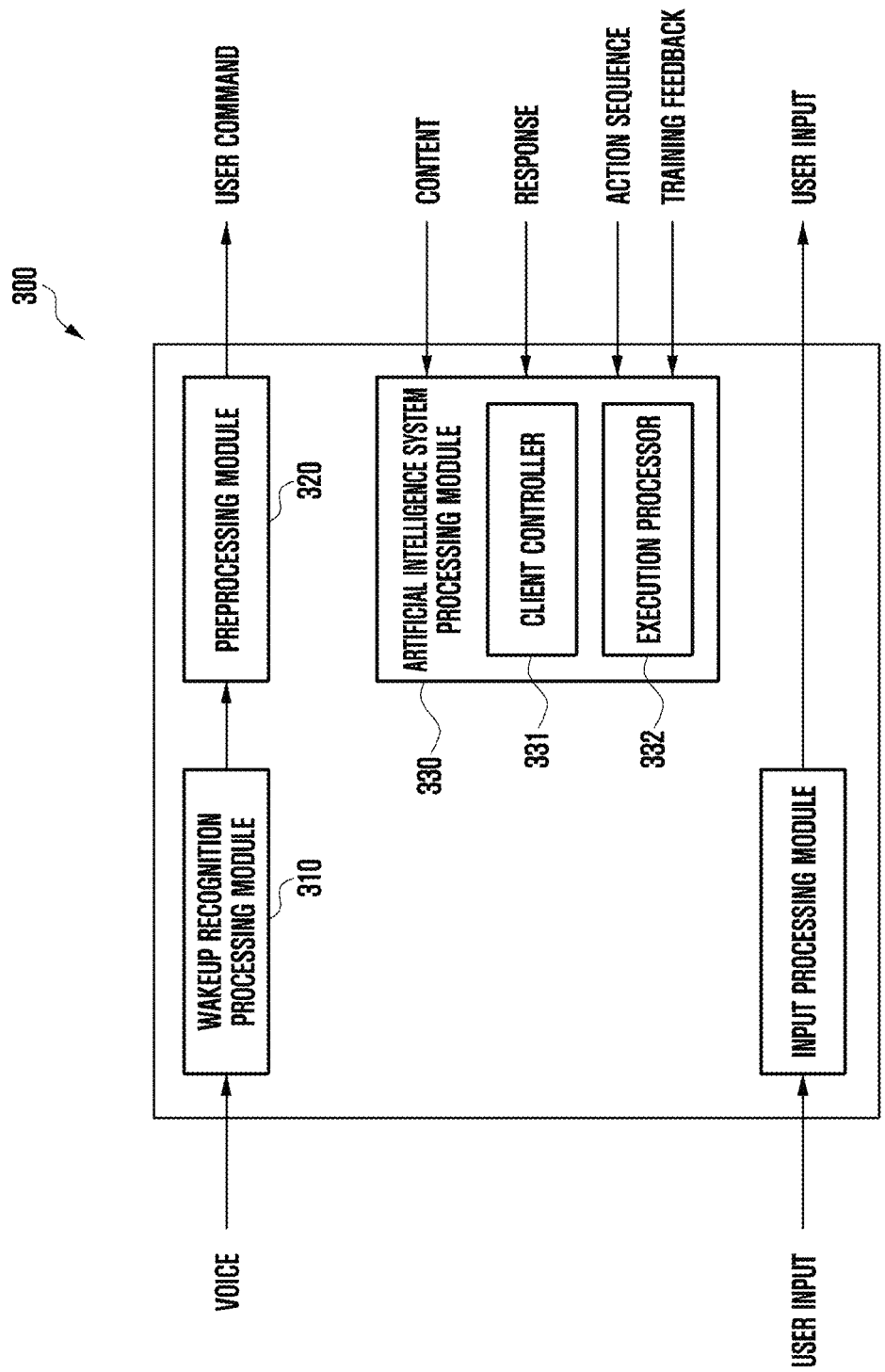
FIG. 3 is a block diagram illustrating an artificial intelligence system client implemented in an electronic device according to various embodiments of the disclosure.

FIG. 3 is a block diagram illustrating an artificial intelligence system client 300 (the artificial intelligence system client 231 of FIG. 2) implemented in an electronic device (the electronic device 101 of FIG. 1A or the electronic device 203 of FIG. 2) according to various embodiments of the disclosure.

The artificial intelligence system client 300 (the artificial intelligence system client 231 of FIG. 2) may include a wakeup recognition processing module 310, a preprocessing module 320, an artificial intelligence system processing module 330, and an input processing module 340.

The electronic device (the electronic device 101 of FIG. 1A or the electronic device 203 of FIG. 2) may acquire a user voice through an input device (for example, the input device 150 of FIG. 1A). The input device (for example, the input device 150 of FIG. 1A) may receive a user utterance or voice through a microphone and convert the utterance or voice into an electrical signal.

When the artificial intelligence system client 300 detect the user voice, the wakeup recognition processing module 310 may identify whether the detected voice is a voice for calling or activating the artificial intelligence system client 300.

For example, when the user utters "Bixby", the call recognition processing module 310 may determine that the voice activates the artificial intelligence assistant client 300.

The preprocessing module 320 may process a voice signal to be an electrical signal, preprocess the voice signal converted into the electrical signal to remove noise, and process the preprocessed signal to be a user command. The preprocessing module 320 may transmit the generated user command to an artificial intelligence client server (for example, the artificial intelligence system server 210 of FIG. 2) through a communication module (for example, the communication module 190 of FIG. 1A).

The artificial intelligence system processing module 330 may receive at least one of content, a response, an action sequence, and a training feedback from the artificial intelligence system server 210 through the communication module (for example, the communication module 190 of FIG. 1A). The action sequence may be the same as a path rule.

The artificial intelligence system processing module 330 may perform a function according to the received action sequence under the control of a processor (for example, the processor 120 of FIG. 1A) of an electronic device (for example, the electronic device 101 of FIG. 1A or the electronic device 203 of FIG. 2) on the basis of at least one of the received content, response, action sequence, and training feedback.

For example, when the user utters "Bixby, make a phone call to my mom", the artificial intelligence system processing module 330 may discover a phone number corresponding "mom" in contacts and make a phone call according to an action sequence received from the artificial intelligence system server (for example, 210).

The artificial intelligence system processing module 330 may include a client controller 331 and an executor manager 332. The executor manager 332 may perform an action for each step on the basis of one or more functions and parameters included in the action sequence and display a progress situation for each step to the user.

The client controller 331 of the artificial intelligence system processing module 330 may control the operation of the artificial intelligence system processing module 330 and the operation of the processor (for example, the processor 120 of FIG. 1A).

The executor manager 332 may make a request for performing a function to an application corresponding to each function for each step and receive an execution result of each function from each application.

For example, when the utterance "send photos recently taken in Hawaii to my mom" is detected by the electronic device (the electronic device 101 of FIG. 1A or the electronic device 203 of FIG. 2) in the state in which the artificial intelligence system is driven, if the artificial intelligence system client 300 transmits the corresponding utterance to the artificial intelligence system server (for example, 210), the artificial intelligence system client 300 may receive the action sequence corresponding thereto from the artificial intelligence system server (for example, 210).

The input processing module 340 may receive user input and process a signal. The user input may be touch input or key input. The input processing module 340 may transmit the user input to the artificial intelligence system server (for example, 210) through the communication module (for example, the communication module 190 of FIG. 1A).

Figure 4:
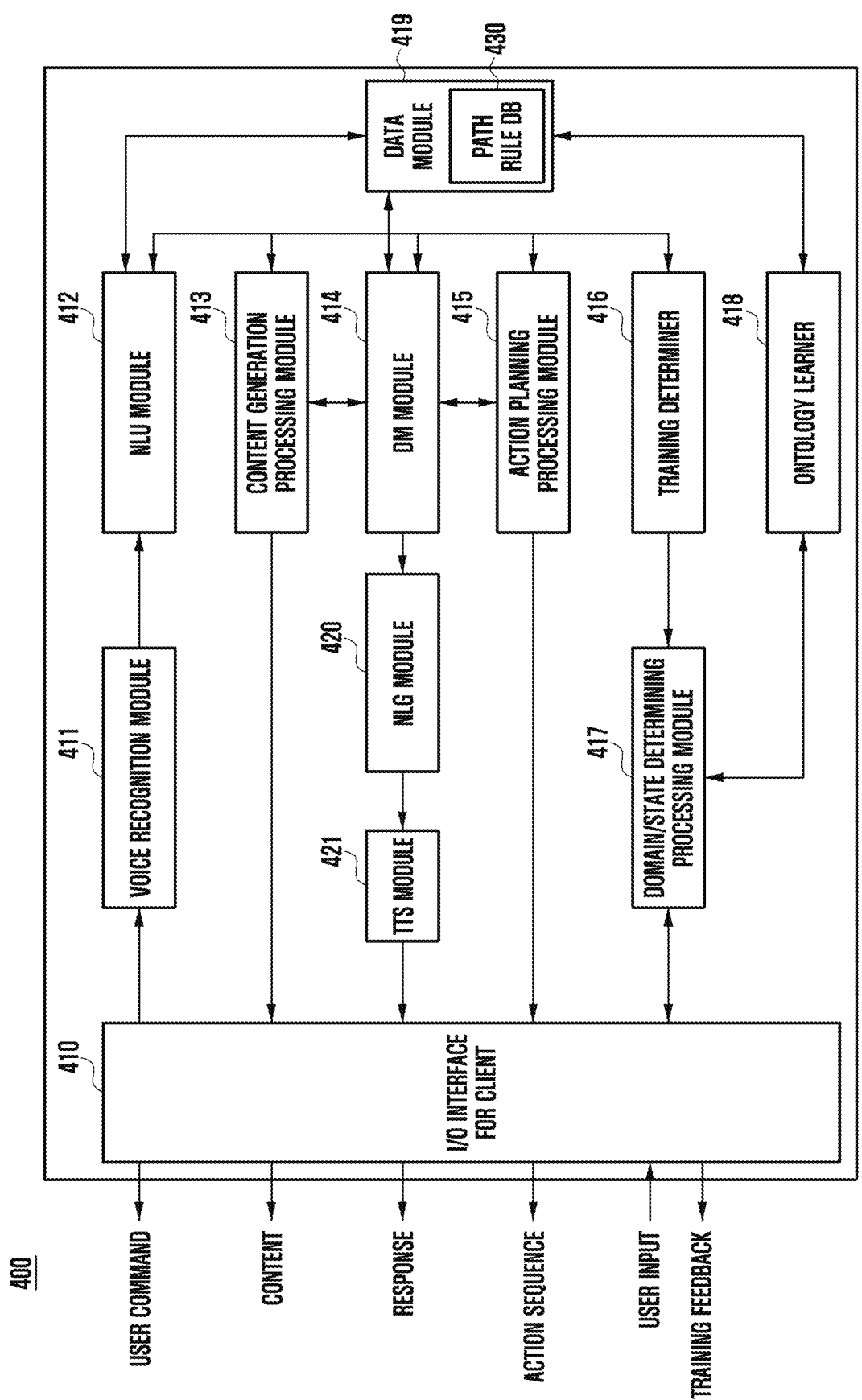
FIG. 4 is a block diagram illustrating an artificial intelligence system server according to various embodiments of the disclosure.

FIG. 4 is a block diagram illustrating an artificial intelligence system server 400 (for example, the server 108 of FIG. 1A or the artificial intelligence system server 210 of FIG. 2) according to various embodiments of the disclosure.

The artificial intelligence system server 400 (for example, the server 108 of FIG. 1A or the artificial intelligence system server 210 of FIG. 2) may include a processor (for example, the processor 120 of FIG. 1A), a communication module (for example, the communication module 190 of FIG. 1A), and a memory (for example, the memory 130 of FIG. 1A).

The artificial intelligence system server 400 may include an input/output (I/O) interface for client 410 (for example, 211 of FIG. 2), a voice recognition module 411, a natural language understanding (NLU) module 412, a content generation processing module 413, a dialogue manager (DM) module 414, an action planning processing module 415, a training determiner 416, a domain/state determining processing module 417, an ontology learner 418, and a data module 419 (for example, 213 of FIG. 2).

The input/output (I/O) interface for client 410 (for example, 211 of FIG. 2), the voice recognition module 411, the natural language understanding (NLU) module 412, the content generation processing module 413, the dialogue manager (DM) module 414, the action planning processing module 415, the training determiner 416, the domain/state determining processing module 417, the ontology learner 418, and the data module 419 (for example, 213 of FIG. 2) may be a process or data stored in the memory of the artificial intelligence system server 400.

The processor of the artificial intelligence system server 400 may perform an artificial intelligence system function by controlling the input/output (I/O) interface for client 410 (for example, 211 of FIG. 2), the voice recognition module 411, the natural language understanding (NLU) module 412, the content generation processing module 413, the dialogue manager (DM) module 414, the action planning processing module 415, the training determiner 416, the domain/state determining processing module 417, the ontology learner 418, the data module 419 (for example, 213 of FIG. 2), and a natural language generator (NLG) module 420, stored in the memory.

The input/output (I/O) interface for client 410 (for example, 211 of FIG. 2) may receive a user command or a user input from the artificial intelligence system client 300 and transmit content, a response, an action sequence, and a training feedback to the artificial intelligence system client 300.

The voice recognition module 411 may be an automatic speech recognition processing module (ASR). The voice recognition module 411 may convert an audio signal into text. The voice recognition module 411 may generate a text query corresponding to an utterance from the user command transmitted through an electrical signal converted from a voice signal.

The natural language understanding (NLU) module 412 may receive the generated text query from the voice recognition module 411 and determine an intent and a slot (for example, a parameter) of the utterance corresponding to the user command on the basis of a predetermined rule or a statistical characteristic.

According to various embodiment, the natural language understanding (NLU) module 412 may receive the generated text query from the voice recognition module 411 and detect an intent and a slot (for example, a parameter) of the utterance corresponding to the user command on the basis of a predetermined rule or a statistical characteristic.

The NLU module 412 may acquire a domain and an intent of the user input, or a parameter (or a slot) required for expressing the intent.

According to an embodiment, the NLU module 412 may determine a user's intent and a parameter using a matching rule divided into the domain, the intent, and the parameter (or slot) required for detecting the intent. The NLU module 412 may determine a response type to be provided to the user on the basis of the determined intent and slot. For example, the response type may be an interactive answer (sentence type), or may be information indicating a function to be performed by the electronic device (the electronic device 101 of FIG. 1A or the electronic device 203 of FIG. 2) or information through an external service search. Alternatively, the response type may be a combination of the answer and the function indication.

The NLU module 412 may transmit the intent and the slot (for example, the parameter) to at least one of the content generation processing module 413, the DM module 414, the action planning processing module 415, and the training determiner 416.

For example, when a user command "send photos recently taken in Hawaii to my mom" is received, the NLU module 412 may determine an intent of "SEND_PHOTO and slots of "Hawaii/ #location", "recently/ #date", and "mom/ #contact_person" and determine an action sequence corresponding thereto. The NLU module 412 may transmit the determined action sequence to at least one of the content generation processing module 413, the DM module 414, the action planning processing module 415, and the training determiner 416.

When the intent and the slot (for example, the parameter) are related to processing the generation of content, the NLU module 412 may transmit an action sequence for processing the generation of content to the content generation processing module 413.

The content generation processing module 413 may generate content by searching for a database in the data module 419 or searching for an external service in external service (for example, 205) according to the intent and the slot (for example, the parameter) and transmit the generated content to the artificial intelligence system client 300 through the I/O interface for client 410 (for example, 211 of FIG. 2).

The NLU module 412 may determine whether the intent and the slot (for example, the parameter) are included in the path rule database 430 included in the data module 419. The training database may be stored in the data module 419. According to various embodiments, the training database may be included in the path rule database 430 stored in the data module 419 or may be stored in the data module 419 separately from the path rule database 430.

When the intent and the slot (for example, the parameter) are included in the path rule database 430 or the training database included in the data module 419, the NLU module 412 may transmit the intent and the slot (for example, the parameter) to at least one of the content generation processing module 413, the DM module 414, the action planning processing module 415, and the training determiner 416 according to the path rule database 430 or the training database.

According to various embodiments, when the intent and the slot (for example, the parameter) have been already learned by the artificial intelligence system server 400, the NLU module 412 may determine an action sequence by first searching a training database and, when there is no search result of the training database, determine an action sequence by searching the path rule database 430.

When the intent and the slot (for example, the parameter) are related to an interactive answer, the NLU module 412 may transmit an action sequence for the interactive answer to the DM module 414 according to the intent and the slot.

The DM module 414 may search the database in the data module 419 or search for an external service in the external services (for example, 205) according to the intent and the slot (for example, the parameter) and transmit the database or the external service to at least one of the content generation processing module 413, the action planning processing module 415, and the NLG module 420 to generate an interactive answer.

According to various embodiments, the DM module 414 may search the database in the data module 419 or search for an external service in the external services (for example, 205) by receiving the action sequence for the interactive answer determined according to the intent and the slot (for example, the parameter) and transmit the database or the external service to at least one of the content generation processing module 413, the action planning processing module 415, and the NLG module 420 to generate an interactive answer.

When the intent and the slot (for example, the parameter) are already included in the training database included in the data module 419, the DM module 414 may transmit the intent and the slot (for example, the parameter) to at least one of the content generation processing module 413, the DM module 414, the action planning processing module 415, and the training determiner 416 according to the training database.

According to an embodiment, the DM module 414 may determine whether the user intent detected by the NLU module 412 is clear. For example, the DM module 414 may determine whether the user intent is clear on the basis of whether information on the parameter is sufficient. The DM module 414 may determine whether the parameter detected by the NLU module 412 is enough to perform a task. According to an embodiment, when the user intent is not clear, the DM module 414 may transmit a feedback making a request for required information to the user. For example, the DM module 414 may transmit the feedback making a request for information on the parameter for detecting the user intent.

According to an embodiment, the DM module 414 may include a content provider module. When the operation can be performed on the basis of the intent and the parameter detected by the NLU module 412, the content provider module may generate a result of the task corresponding to the user input. According to an embodiment, the DM module 414 may transmit the result generated by the content provider module to the electronic device 101 in response to the user input.

The NLG module 420 may generate a natural language using the interactive answer from the DM module 414 according to a command of generating the interactive answer and transmit the generated natural language to the TTS module 421 to generate a voice. The generated voice may be transmitted to the artificial intelligence system client 300 through the I/O interface for client 410 (for example, 211 of FIG. 2).

The content generation processing module 413 may generate a response obtained by combining the content and the interactive answer according to the command for generating the interactive answer from the DM module 414 and transmit the generated response to the artificial intelligence system client 300 through the I/O interface for client 410 (for example, 211 of FIG. 2).

The content generation processing module 415 may generate a response obtained by combining the action sequence and the interactive answer according to the command for generating the interactive answer from the DM module 414 and transmit the generated response to the artificial intelligence system client 300 through the I/O interface for client 410 (for example, 211 of FIG. 2).

When the intent is not clear, the DM module 414 may generate the interactive answer. The interactive answer generated by the DM module 414 when the intent is not clear may be an answer to make the user's utterance intent be clear.

When the intent and the slot (for example, the parameter) are related to artificial intelligence system training, the NLU module 412 may transmit the intent and the slot (for example, the parameter) to the training determiner 416.

For example, when a user command "I will let you know" is detected, the NLU module 412 may determine the artificial intelligence system training.

According to various embodiments, when there is a user's negative reaction or the same and repetitive reactions, the NLU module 412 may determine that the intent and the slot (for example, parameter) are related to the artificial intelligence system training.

When it is determined that the intent and the slot (for example, the parameter) are related to artificial intelligence system training, the training determiner 416 may perform the artificial intelligence system training and transmit the user command to the domain/state determining processing module 417.

When user input for the artificial intelligence system training is input through the I/O interface for client 410 (for example, 211 of FIG. 2), the domain/state determining processing module 417 may sequentially arrange the domain and the state according to the user input.

The domain may be information on an application (for example, a type and a name of the application selected by the user), and the state may be information on a screen operated by the application. When user input for the artificial intelligence system training is input through the I/O interface for client 410 (for example, 211 of FIG. 2), a screen of an application is changed according to a user touch and the sequence of the changed screen states may be stored. Further, when user input for the artificial intelligence system training is input through the I/O interface for client 410 (for example, 211 of FIG. 2), the screen of the application may be changed according to the user touch, the sequence of the changed screen states may be stored, information indicating which parameter for each screen generates a trained path rule or an action sequence after information on the sequence of screen states is stored, and the generated path rule or action sequence may be stored in a training database or a path rule database 430.

The user input may be a touch or key input through, for example, a user interface of the artificial intelligence system client 300. According to various embodiments, the user input may be an input through a learning tool of the artificial intelligence system client 300. The learning tool may be, for example, an artificial intelligence system training application included in the artificial intelligence system client 300.

The domain/state determining processing module 417 may receive domain and state information according to a user input or a user command, sequentially arrange the domain and state information, and transmit the same to the ontology learner 418.

The domain/state determining processing module 417 may transmit a training feedback for the sequentially arranged user input or user command to the artificial intelligence system client 300 through the I/O interface for client 410 (for example, 211 of FIG. 2).

After searching an appropriate intent (or ontology) on the basis of the domain and state information, the ontology learner 418 may register the intent in a table to match a learned intent value required to be modified, newly generate a trained path rule of action sequence, and register the path rule or the action sequence in a training database included in the data module 419 (for example, 213 of FIG. 2).

The state may be a state of an application shown on the current screen. Each action of the application may be identified by the state, and there may be a parameter required for each state.

Figure 5A:
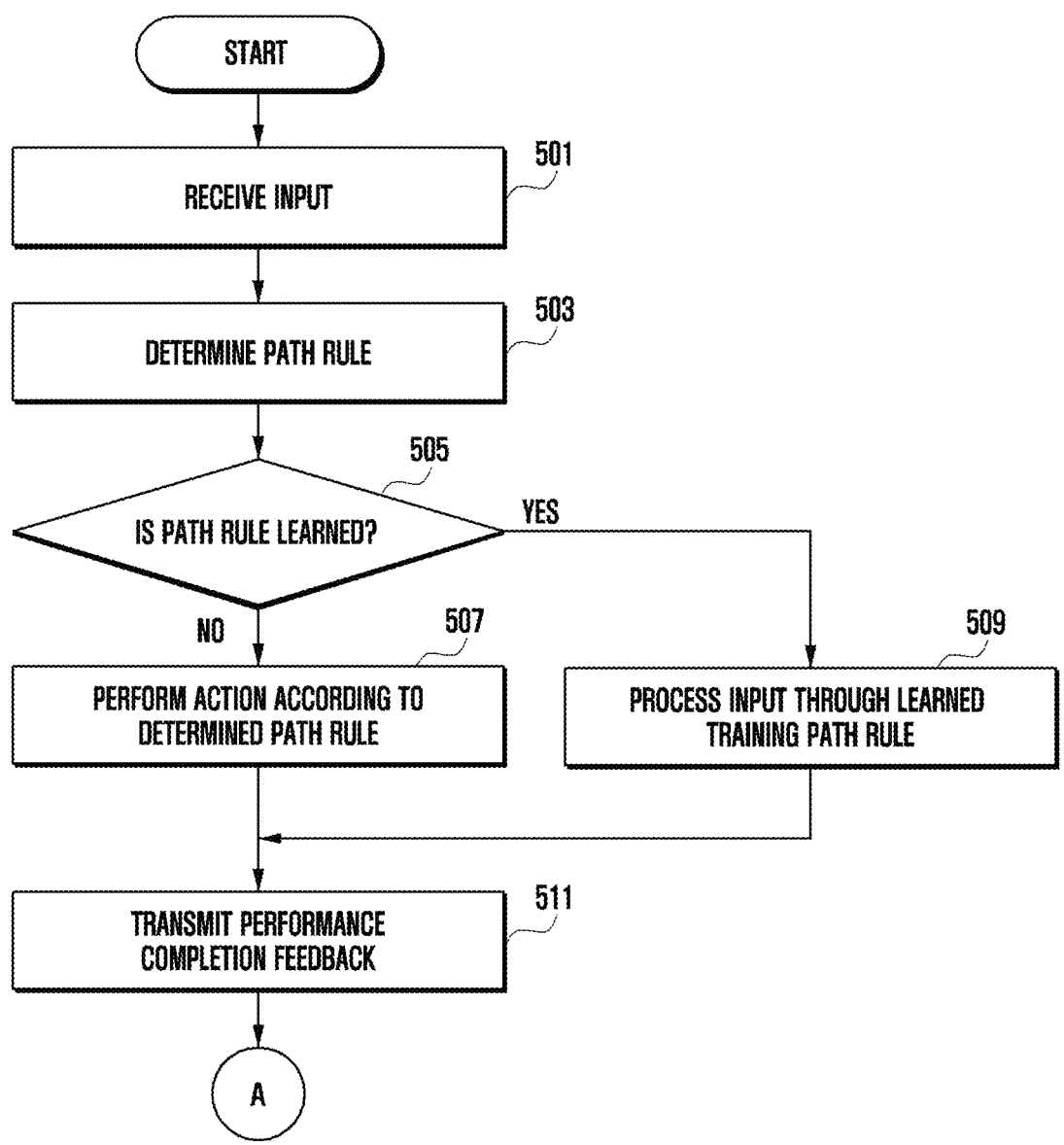
FIGS. 5A and 5B are flowcharts illustrating the operation of an artificial intelligence system server according to various embodiments of the disclosure.
Figure 5B:
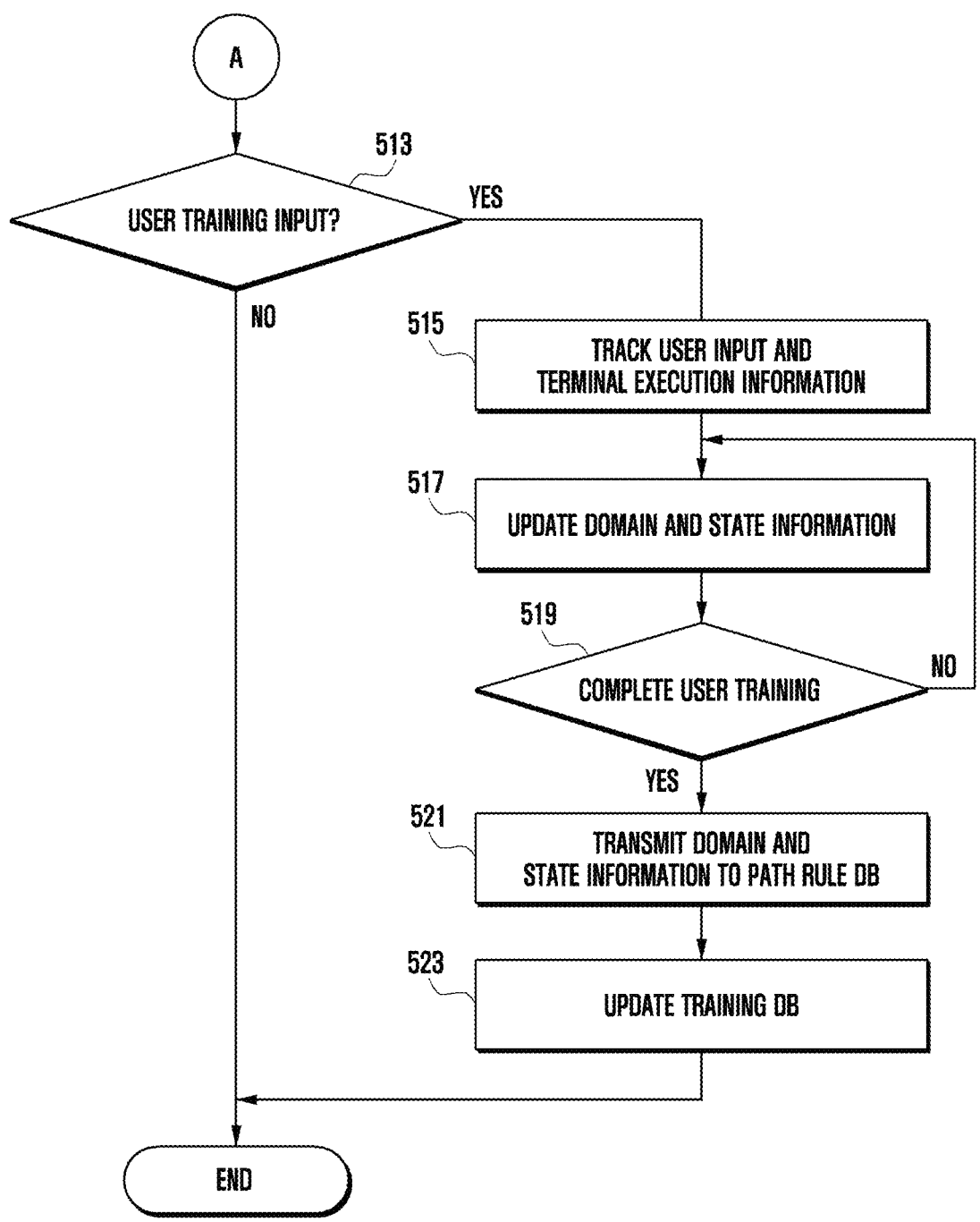

For example, when a previously incorrectly matched intent is "DevMaint_100", the connection to the trained intent "Settings_1002" may be made FIGS. 5A and 5B are flowcharts illustrating the operation of the artificial intelligence system server 400 (for example, the server 108 of FIG. 1A or the artificial intelligence system server 210 of FIG. 2) according to various embodiments of the disclosure.

The artificial intelligence system server 400 may receive an input under the control of a processor (for example, the processor 120 of FIG. 1A) in operation 501. The input may be a user command or a user input.

According to various embodiments, the artificial intelligence system server 400 may receive an input through the I/O interface for client 410 (for example, 211 of FIG. 2) under the control of the processor (for example, the processor 120 of FIG. 1A) in operation 501.

The artificial intelligence system server 400 may determine a command performance rule according to the input under the control of the processor (for example, the processor 120 of FIG. 1A) in operation 503. The command performance rule may be, for example, a pre-stored path rule according to an intent and a slot.

According to various embodiments, the artificial intelligence system server 400 may determine an intent and a slot (for example, a parameter) from the input under the control of the processor (for example, the processor 120 of FIG. 1A) and determine the command performance rule in operation 503.

According to various embodiments, the artificial intelligence system server 400 may determine the intent and the slot (for example, the parameter) from the input under the control of the processor (for example, the processor 120 of FIG. 1A) in operation 503.

According to various embodiments, the artificial intelligence system server 400 may determine the intent and the slot (for example, the parameter) through the NLU module 412 under the control of the processor (for example, the processor 120 of FIG. 1A) in operation 503.

The artificial intelligence system server 400 may determine a command rule according to the determined intent and slot under the control of the processor (for example, the processor 120 of FIG. 1A) and determine whether the command rule is learned by the determined path rule or action sequence in operation 505.

According to various embodiments, the artificial intelligence system server 400 may determine the command rule according to the determined intent and slot under the control of the processor (for example, the processor 120 of FIG. 1A) and determine whether there is a learned training database related to the determined path rule or action sequence in operation 505.

When there is the learned training database, the artificial intelligence system server 400 may process the input through the learned training path rule or action sequence under the control of the processor (for example, the processor 120 of FIG. 1A) in operation 509.

When there is no learned training database, the artificial intelligence system server 400 may perform the action through the determined path rule or action sequence under the control of the processor (for example, the processor 120 of FIG. 1A) in operation 507.

According to various embodiments, the artificial intelligence system server 400 may determine one or more of content, an interactive answer, a path rule or action sequence, or an answer according to the intent and the slot (for example, the parameter) under the control of the processor (for example, the processor 120 of FIG. 1A) in operation 507.

When the input is processed through the learned training rule or the action is performed through the determined path rule or action sequence in operation 507 or 509, the artificial intelligence system server 400 may perform a performance completion feedback operation under the control of the processor (for example, the processor 120 of FIG. 1A) in operation 511.

According to various embodiments, the artificial intelligence system server 400 determines whether the user command can be executed under the control of the processor (for example, the processor 120 of FIG. 1A) and, when the user command cannot be executed, generate a natural language of "It is not a possible request in the current app or service" through the NLG module 420 in operation 511.

At this time, the artificial intelligence system server 400 may propose an action of "User directly teaches" and suggest a proactive guide such as "Did I do something wrong? Let me know, please" to the user when the user command cannot be performed in operation 511, and proceed to step 513 when a simple answer of "Yes/No" of the user is received.

The artificial intelligence system server 400 may determine whether the intent and the slot are related to a user training input under the control of the processor (for example, the processor 120 of FIG. 1A) in operation 513.

According to various embodiments, the artificial intelligence system server 400 may determine whether a user input using multi modal such as a user touch and a key event as well as the intent and the slot through the training determiner 416 under the control of the processor (for example, the processor 120 of FIG. 1A) in operation 513.

When it is determined that the intent and the slot are not related to the user training input, the process may end.

According to various embodiments, when the training determiner 416 determines that the user input using the multi modal such as the user touch and the key event as well as the intent and the slot are not related to the user training input, the process may end.

When it is determined that the intent and the slot are related to the user training input, the artificial intelligence system server 400 may track the user input and execution information of the electronic device (for example, the electronic device 101 of FIG. 1A or the electronic device 203 of FIG. 2) under the control of the processor (for example, the processor 120 of FIG. 1A) in operation 515.

According to various embodiments, when it is determined that the intent and the slot are related to the user training input, the artificial intelligence system server 400 may track the user input and execution information of the electronic device (for example, the electronic device 101 of FIG. 1A or the electronic device 203 of FIG. 2) under the control of the processor (for example, the processor 120 of FIG. 1A) in operation 515 so as to sequentially arrange the domain and state information.

The domain may be information on an application (for example, a type and a name of the application selected by the user), and the state may be information on a screen operated by the application. When user input for the artificial intelligence system training is input through the I/O interface for client 410 (for example, 211 of FIG. 2), a screen of an application is changed according to a user touch and the sequence of the changed screen states may be stored. Further, when user input for the artificial intelligence system training is input through the I/O interface for client 410 (for example, 211 of FIG. 2), the screen of the application may be changed according to the user touch, the sequence of the changed screen states may be stored, information indicating which parameter for each screen generates a trained path rule or an action sequence after information on the sequence of screen states is stored, and the generated path rule or action sequence may be stored in a training database or a path rule database 430. The state information may include a state of a lower menu of the application and information on a user input window.

According to various embodiments, when it is determined that the intent and the slot are related to the user training input, the artificial intelligence system server 400 may track the user input and execution information of the electronic device (for example, the electronic device 101 of FIG. 1A or the electronic device 203 of FIG. 2) through the domain/state determining processing module 417 under the control of the processor (for example, the processor 120 of FIG. 1A) in operation 515.

The artificial intelligence system server 400 may determine whether the user training is completed under the control of the processor (for example, the processor 120 of FIG. 1A) in operation 519.

When the user training is not completed, operation 517 may be performed.

When the user training is completed, the artificial intelligence system server 400 may search an appropriate intent (or ontology), register the domain and the state information sequentially arranged by the domain/state determining processing module 417 in a table such that the searched intent matches a learned intent value required to be modified, newly generate a trained path rule or an action sequence according to the registered table, and transmit the newly generated trained path rule or action sequence to a path rule database (or a training database) under the control of the processor (for example, the processor 120 of FIG. 1A) in operation 521.

The artificial intelligence system server 400 may update the path rule or the action sequence in the training database in the data module 419 (for example, 213 of FIG. 2) under the control of the processor (for example, the processor 120 of FIG. 1A) in operation 523.

According to various embodiments, the artificial intelligence system server 400 may update the path rule or the action sequence in the training database in the data module 419 (for example, 213 of FIG. 2) and transmit training feedback information for training to the electronic device (for example, the electronic device 101 of FIG. 1) under the control of the processor (for example, the processor 120 of FIG. 1A) in operation 523.

Figure 6:
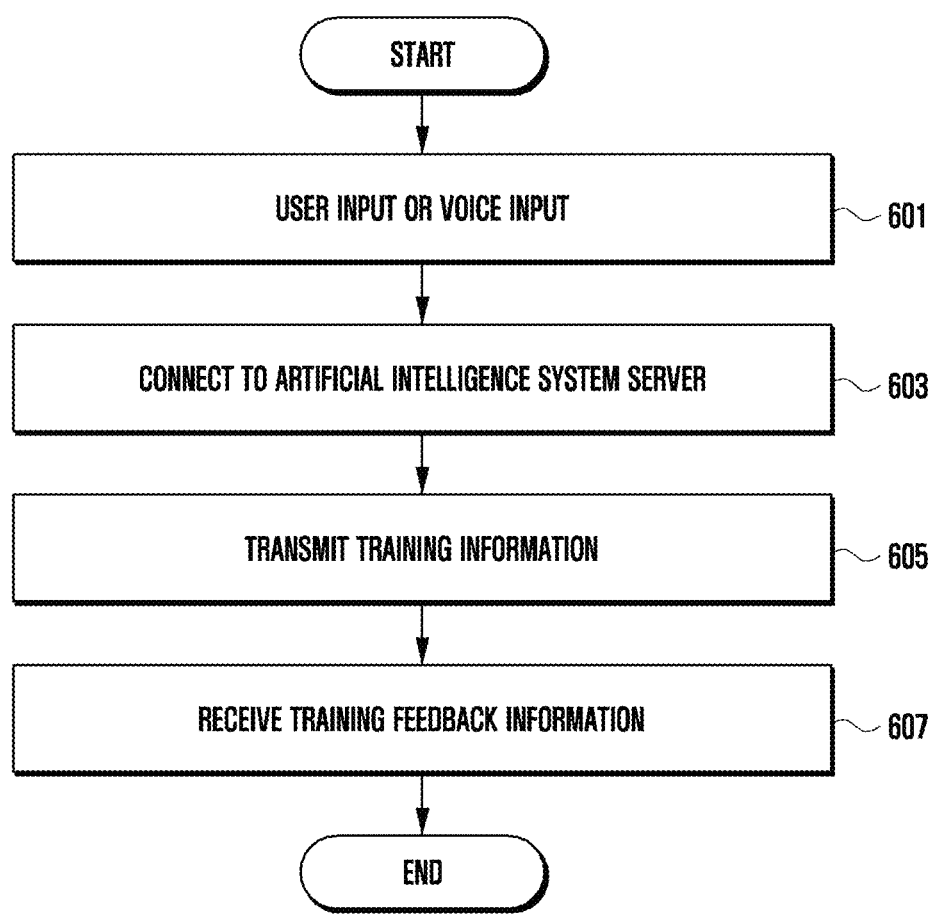
FIG. 6 is a flowchart illustrating the operation of an artificial intelligence system client according to various embodiments of the disclosure.

FIG. 6 is a flowchart illustrating the operation of an artificial intelligence system client (for example, 231 of FIG. 2 or 300 of FIG. 3) according to various embodiments of the disclosure.

An artificial intelligence system client (for example, 231 of FIG. 2 or 300 of FIG. 3) of an electronic device (the electronic device 101 of FIG. 1A or the electronic device 203 of FIG. 2) may receive a user input or a voice input through an input device (for example, the input device 150 of FIG. 1A) under the control of a processor (for example, the processor 120 of FIG. 1A) in operation 601.

The artificial intelligence system client (for example, 231 of FIG. 2 or 300 of FIG. 3) of the electronic device (the electronic device 101 of FIG. 1A or the electronic device 203 of FIG. 2) may be connected to an artificial intelligence system server (for example, 210 of FIG. 2 or 400 of FIG. 4) according to the user input or the voice input under the control of the processor (for example, the processor 120 of FIG. 1A) in operation 603.

The artificial intelligence system client (for example, 231 of FIG. 2 or 300 of FIG. 3) of the electronic device (the electronic device 101 of FIG. 1A or the electronic device 203 of FIG. 2) may transmit training information according to the user input or the voice input to the artificial intelligence system server (for example, 210 of FIG. 2 or 400 of FIG. 4) through a communication module (for example, the communication module 190 of FIG. 1A) under the control of the processor (for example, the processor 120 of FIG. 1A) in operation 605.

The artificial intelligence system client (for example, 231 of FIG. 2 or 300 of FIG. 3) of the electronic device (the electronic device 101 of FIG. 1A or the electronic device 203 of FIG. 2) may receive training feedback information from the artificial intelligence system server (for example, 210 of FIG. 2 or 400 of FIG. 4) through the communication module (for example, the communication module 190 of FIG. 1A) under the control of the processor (for example, the processor 120 of FIG. 1A) in operation 607.

Figure 7:
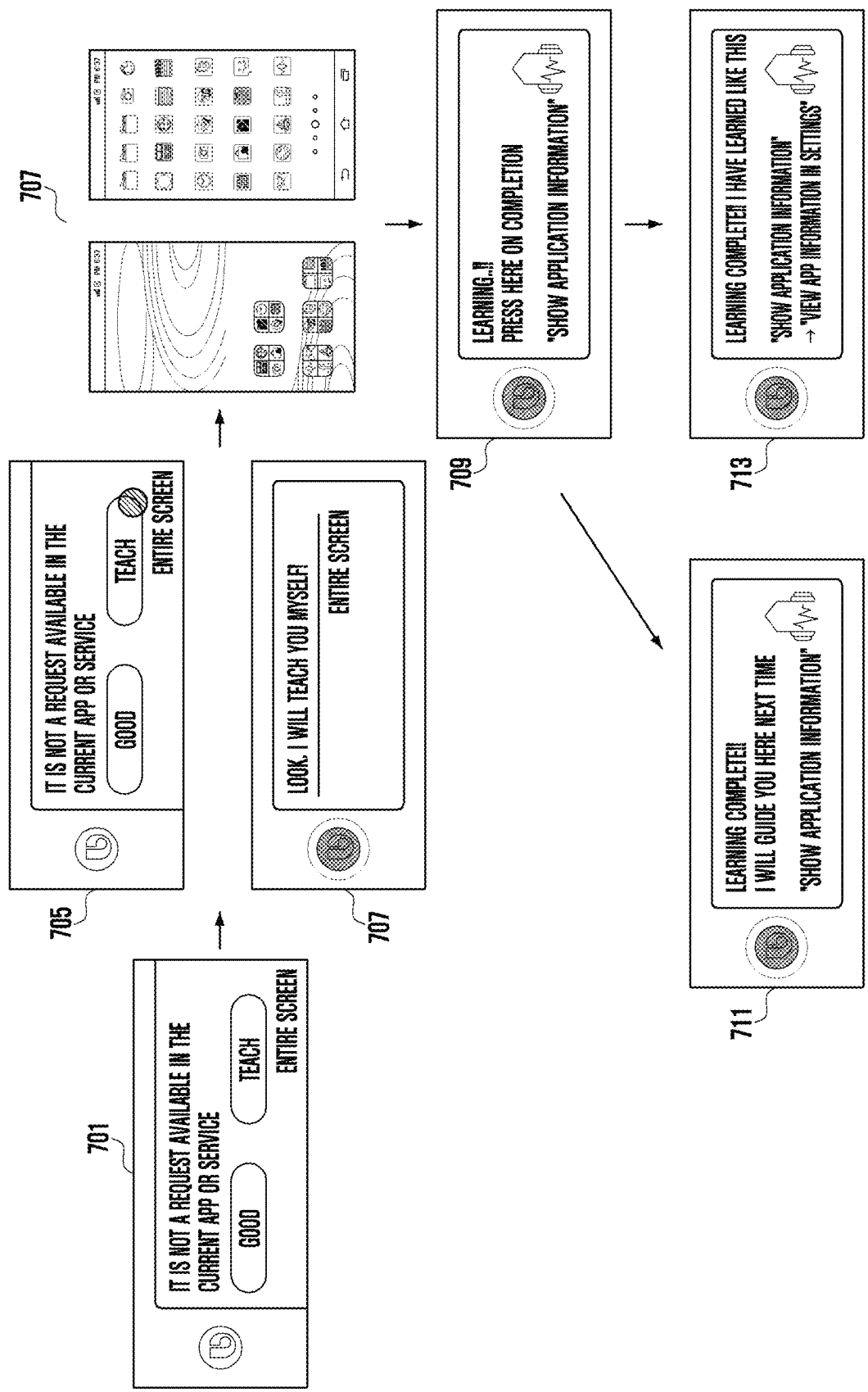
FIG. 7 illustrates a method of training an artificial intelligence system according to various embodiments of the disclosure.

FIG. 7 illustrates a method of training an artificial intelligence system according to various embodiments of the disclosure.

In a screen 701, the electronic device (for example, the electronic device 101 of FIG. 1A or the electronic device 203 of FIG. 2) may receive a user input or command, receive an interactive answer from the artificial intelligence system server 400, and display the interactive answer through a user interface.

For example, when it is determined that a user intent is not clear, the artificial intelligence system server 400 may display a message of "It is not a request available in the current app or service." through a popup window, a speech bubble, and a message box of a display device (for example, 160 of FIG. 1A) and/or output the same to a sound output device (for example, 155).

In addition to the message of "It is not a request available in the current app or service", preference such as "good" and a graphic user interface related to artificial intelligence system training such as "teach" may be displayed in the form of a button, a menu, or an icon.

According to various embodiments, the artificial intelligence system server 400 may determine whether a user command can be performed or not and, when the user command cannot be performed, generate a natural language such as "It is not a request available in the current app or service" through the NLG module 420 and display the same on the display unit.

At this time, the artificial intelligence system server 400 may propose an action of "User directly teaches" and, when the user command cannot be performed, suggest a proactive guide such as "Did I do something wrong? Let me know, please" to the user, and display a simple answer of Yes/No of the user.

According to various embodiments, in addition to the message of "It is not a request available in the current app or service", a graphic user interface related to cancelling of the artificial intelligence system such as "Entire screen" may be displayed in the form of a button, a menu, or an icon.

The graphic user interface may be displayed in the form of a button, a menu, or an icon.

A screen 705 illustrates the case in which the graphic user interface for artificial intelligence system training such as "Teach" is input (for example, a touch) through a button, a menu, or an icon.

A screen 706 is a user interface in the case in which the electronic device (for example, the electronic device 101 of FIG. 1A or the electronic device 203 of FIG. 2) directly receives a user input or command for training from the user.

For example, when a user input or command of "Look. I will teach you myself" is received directly from the user, a user utterance may be displayed through a popup window, a speech bubble, or a message box of a display device (for example, 160 of FIG. 1A).

A screen 707 is a user interface for an action of changing a domain/state according to the user input or command in the electronic device (for example, the electronic device 101 of FIG. 1A or the electronic device 203 of FIG. 2).

The artificial intelligence system server 400 may change the domain/state according to the user input or command received from the electronic device (for example, the electronic device 101 of FIG. 1A or the electronic device 203 of FIG. 2) and transmit the domain/state to the electronic device (for example, the electronic device 101 of FIG. 1A or the electronic device 203 of FIG. 2) through training feedback information. The electronic device (for example, the electronic device 101 of FIG. 1A or the electronic device 203 of FIG. 2) may display the training feedback information received from the artificial intelligence system server 400 on a display device (for example, 160 of FIG. 1A).

A screen 709 is a screen indicating whether training is completed during the action of changing the domain/state according to the user input or command in the electronic device (for example, the electronic device 101 of FIG. 1A or the electronic device 203 of FIG. 2).

For example, when the artificial intelligence system server 400 is changing the domain/state according to the user input or command from the electronic device (for example, the electronic device 101 of FIG. 1A or the electronic device 203 of FIG. 2), the artificial intelligence system server 400 may transmit training feedback information such as "Learning..!! Press here on completion" or "Show application information" to the electronic device (for example, the electronic device 101 of FIG. 1A or the electronic device 203 of FIG. 2). The electronic device (for example, the electronic device 101 of FIG. 1A or the electronic device 203 of FIG. 2) may display the training feedback information received from the artificial intelligence system server 400 on a display device (for example, 160 of FIG. 1A).

A screen 711 is a screen indicating completion of the domain/state change according to the user input or command in the electronic device (for example, the electronic device 101 of FIG. 1A or the electronic device 203 of FIG. 2).

When a new training database is detected, the artificial intelligence system server 400 may transmit training feedback information such as "Learning complete!!! I will guide you here next time" or "Show application information" to the electronic device (for example, the electronic device 101 of FIG. 1A or the electronic device 203 of FIG. 2). The electronic device (for example, the electronic device 101 of FIG. 1A or the electronic device 203 of FIG. 2) may display the training feedback information received from the artificial intelligence system server 400 on a display device (for example, 160 of FIG. 1A).

A screen 713 is a screen indicating completion of the domain/state change according to the user input or command in the electronic device (for example, the electronic device 101 of FIG. 1A or the electronic device 203 of FIG. 2).

When the conventional training database is detected, the artificial intelligence system server 400 may transmit training feedback information such as "Learning complete!!! I have learned like this", "Show application information", or "View app information in settings" to the electronic device (for example, the electronic device 101 of FIG. 1A or the electronic device 203 of FIG. 2). The electronic device (for example, the electronic device 101 of FIG. 1A or the electronic device 203 of FIG. 2) may display the training feedback information received from the artificial intelligence system server 400 on a display device (for example, 160 of FIG. 1A).

Figure 8:
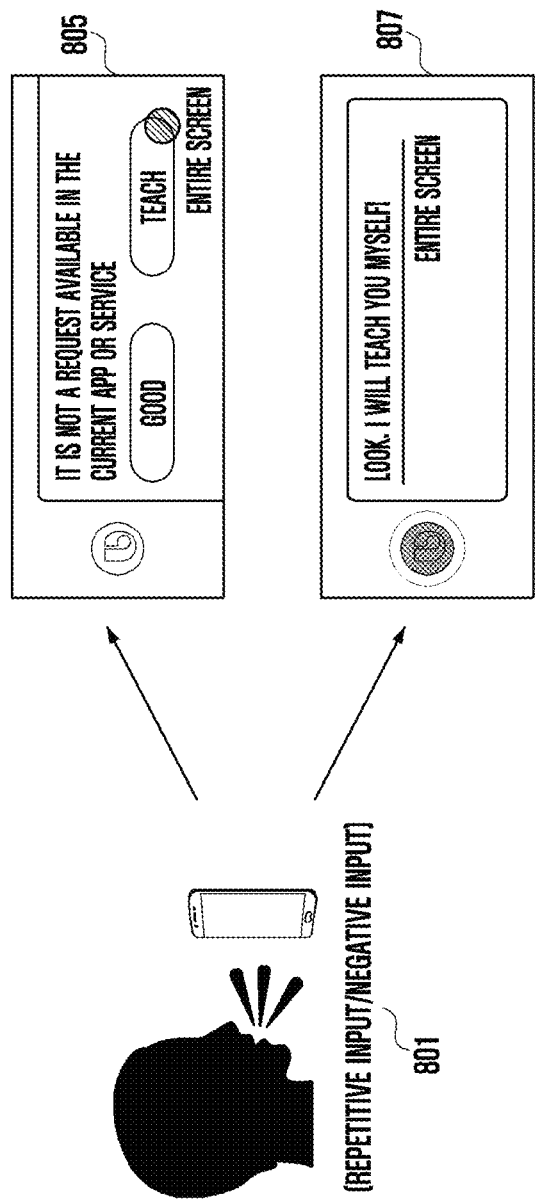
FIG. 8 illustrates a screen showing a method of training an artificial intelligence system according to various embodiments of the disclosure.

FIG. 8 illustrates a screen showing a method of training an artificial intelligence system according to various embodiments of the disclosure.

In a screen 801, the artificial intelligence system server 400 may receive a repetitive input or a negative input from the electronic device (for example, the electronic device 101 of FIG. 1A or the electronic device 203 of FIG. 2). Upon receiving the repetitive input or the negative input, the artificial intelligence system server 400 may detect a user intent as an intent to perform an action of training an artificial intelligence system.

For example, the repetitive input may include the case in which an input having an unclear user intent is repeatedly input, and the negative input may include the case in which a user input of "No" is received.

According to various embodiments, the artificial intelligence system server 400 may determine whether a user command can be performed or not and, when the user command cannot be performed, generate a natural language such as "It is not a request available in the current app or service" through the NLG module 420 and display the same on the display unit.

At this time, the artificial intelligence system server 400 may propose an action of "User directly teaches" and, when the user command cannot be performed, suggest a proactive guide such as "Did I do something wrong? Let me know, please" to the user, and display a simple answer of Yes/No of the user.

For example, referring to a screen 705, when the input is determined as the repetitive input or the negative input, the artificial intelligence system server 400 may display a message of "It is not a request available in the current app or service." through a popup window, a speech bubble, and a message box of a display device (for example, 160 of FIG. 1A) and/or output the same to a sound output device (for example, 155).

In addition to the message of "It is not a request available in the current app or service", preference such as "good" and a graphic user interface related to artificial intelligence system training such as "teach" may be displayed in the form of a button, a menu, or an icon.

According to various embodiments, in addition to the message of "It is not a request available in the current app or service", a graphic user interface related to cancelling of the artificial intelligence system such as "Entire screen" may be displayed in the form of a button, a menu, or an icon.

The graphic user interface may be displayed in the form of a button, a menu, or an icon.

A screen 805 illustrates the case in which the graphic user interface for artificial intelligence system training such as "Teach" is input (for example, a touch) through a button, a menu, or an icon.

A screen 807 is a user interface in the case in which the electronic device (for example, the electronic device 101 of FIG. 1A or the electronic device 203 of FIG. 2) directly receives a user input or command for training from the user.

For example, when a user input or command of "Look. I will teach you myself" is received directly from the user, a user utterance may be displayed through a popup window, a speech bubble, or a message box of a display device (for example, 160 of FIG. 1A).

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. A method for training an artificial intelligence system, the method comprising:
  receiving a first user input;
  receiving, from an intelligent server, a path rule, wherein the intelligent server selects the path rule from a set of predefined path rules stored in the intelligent server or generates the path rule based on a user request;
  determining an action sequence based on the first user input, the action sequence comprising a plurality of actions;
  determining whether there is a learned training database related to the determined action sequence;
  performing an action using the determined action sequence based on determination that there is no the learned training database related to the determined action sequence, wherein the action is performed based on the path rule;
  determining whether the determined action sequence is a second user input for user training in case that the second user input is a user's voice input providing a negative reaction or repetitive reactions;
  displaying a user interface for updating domain information and state information based on determination that the action sequence is the second user input for the user training, and receiving a third user input through the user interface;
  tracking the third user input and execution information of an electronic device to sequentially arrange the domain information and the state information, wherein the domain information is identified for an application selected through the user interface and the state information is identified for a screen operated by the application;
  updating the domain information and the state information according to the tracked user input and execution information of the electronic device;
  when a user training action is completed, transmitting, to the learned training database, the updated domain information and the state information and displaying a feedback screen indicating completion of update of the domain information and the state information; and
  updating the learned training database according to the updated domain information and the state information.

2. The method of claim 1, further comprising, when the user training action is not completed, updating the domain information and the state information according to the tracked user input and execution information of the electronic device.

3. The method of claim 1, wherein updating the learned training database comprises searching an appropriate intent or ontology and registering the sequentially arranged domain information and the state information in a table such that the searched intent matches a learned intent value required to be modified.

4. The method of claim 3, wherein updating the learned training database further comprises at least one of:
generating a training path according to the registered table;
transmitting the generated training path to a path rule database; or
transmitting training feedback information for training the electronic device.

5. The method of claim 1, wherein determining the action sequence according to the first user input comprises determining an intent and a slot according to the first user input and determining a command rule according to the determined intent and slot.

6. An electronic device comprising:
communication circuitry;
a processor; and
memory,
wherein the memory stores instructions causing the processor to:
receive a first user input;
receive, from an intelligent server, a path rule, wherein the intelligent server selects the path rule from a set of predefined path rules stored in the intelligent server or generates the path rule based on a user request;
determine an action sequence based on the first user input, wherein the action sequence comprises a plurality of actions;
determine whether there is a learned training database related to the determined action sequence;
perform an action using the determined action sequence based on determination that there is no the learned training database related to the determined action sequence, wherein the action is performed based on the path rule;
determine whether the determined action sequence is a second user input for user training in case that the second user input is a user's voice input providing a negative reaction or repetitive reactions;
display a user interface for updating domain information and state information based on determination that the action sequence is the second user input for the user training, and receive a third user input through the user interface;
track the third user input and execution information of the electronic device to sequentially arrange the domain information and the state information based on determination that the action sequence is the input for the user training, wherein the domain information is identified for an application selected through the user interface and the state information is identified for a screen operated by the application;
update the domain information and the state information according to the tracked user input and execution of the electronic device;
when a user training action is completed, transmit, to the learned training database, the updated domain and the state information and display a feedback screen indicating completion of update of the domain information and the state information; and
update the learned training database according to the updated domain information and the state information.

7. The electronic device of claim 6, wherein the memory stores instructions causing the processor configured to, when a user training action is not completed, update the domain information and the state information according to the tracked user input and execution information of the electronic device.

8. The electronic device of claim 6, wherein the memory stores instructions causing the processor configured to search an appropriate intent or ontology and register the sequentially arranged domain information and the state information in a table such that the searched intent matches a learned intent value required to be modified.

9. The electronic device of claim 8, wherein the memory stores one or more of instructions causing the processor configured to:
generate a training path according to the registered table,
transmit the generated training path to a path rule database, or
transmit training feedback information for training the electronic device.

10. The electronic device of claim 6, wherein the second user input is a user voice command or a user touch input.

11. The electronic device of claim 6, wherein the memory stores one or more of instructions causing the processor configured to determine an intent and a slot according to the first user input and determining a command rule according to the determined intent and slot.

* * * * *